(12) United States Patent
Iinuma et al.

(10) Patent No.: US 7,210,796 B2
(45) Date of Patent: May 1, 2007

(54) OPTICAL APPARATUS AND PROJECTOR

(75) Inventors: Kazuyuki Iinuma, Hotaka-machi (JP); Hidetoshi Hashizume, Hotaka-machi (JP); Hiroshi Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/213,755

(22) Filed: Aug. 30, 2005

(65) Prior Publication Data

US 2006/0050253 A1    Mar. 9, 2006

(30) Foreign Application Priority Data

Sep. 7, 2004    (JP)    ............................. 2004-259830

(51) Int. Cl.
*G03B 21/28*    (2006.01)
*G03B 21/22*    (2006.01)
(52) U.S. Cl. ......................................... 353/98; 353/119
(58) Field of Classification Search ................. 353/37, 353/72, 77, 85, 98, 119; 352/242
See application file for complete search history.

(56) References Cited

U.S. PATENT DOCUMENTS 4,657,316 A * 4/1987 Hardt et al. ................. 312/7.2
5,520,361 A * 5/1996 Lee ............................. 248/398
5,806,940 A * 9/1998 Heirich ........................ 312/7.2
2005/0157276 A1* 7/2005 Kitabayashi et al. .......... 353/98

FOREIGN PATENT DOCUMENTS

JP    A-2000-321661    11/2000

* cited by examiner

Primary Examiner—Melissa J Koval
(74) Attorney, Agent, or Firm—Oliff & Berridge, PLC

(57) ABSTRACT

An optical apparatus with plural optical components, including a reflection mirror provided in an optical path of light beams emitted from a light source, and a case for housing the optical components in a predetermined position with respect to the light beams. The optical apparatus has a convex curved surface protruding to the surface of the reflection mirror, and a pair of fixing parts mounted to the back surface of the reflection mirror to sandwich the protruded part therebetween. The case is formed from a component housing member having an opening through which the plural optical components are housed and a lid member for closing the opening. The side wall is provided with fixing grooves to house the reflection mirror in the case and to guide the pair the of fixing parts in placing the reflection mirror in the case.

14 Claims, 14 Drawing Sheets

F I G. 5
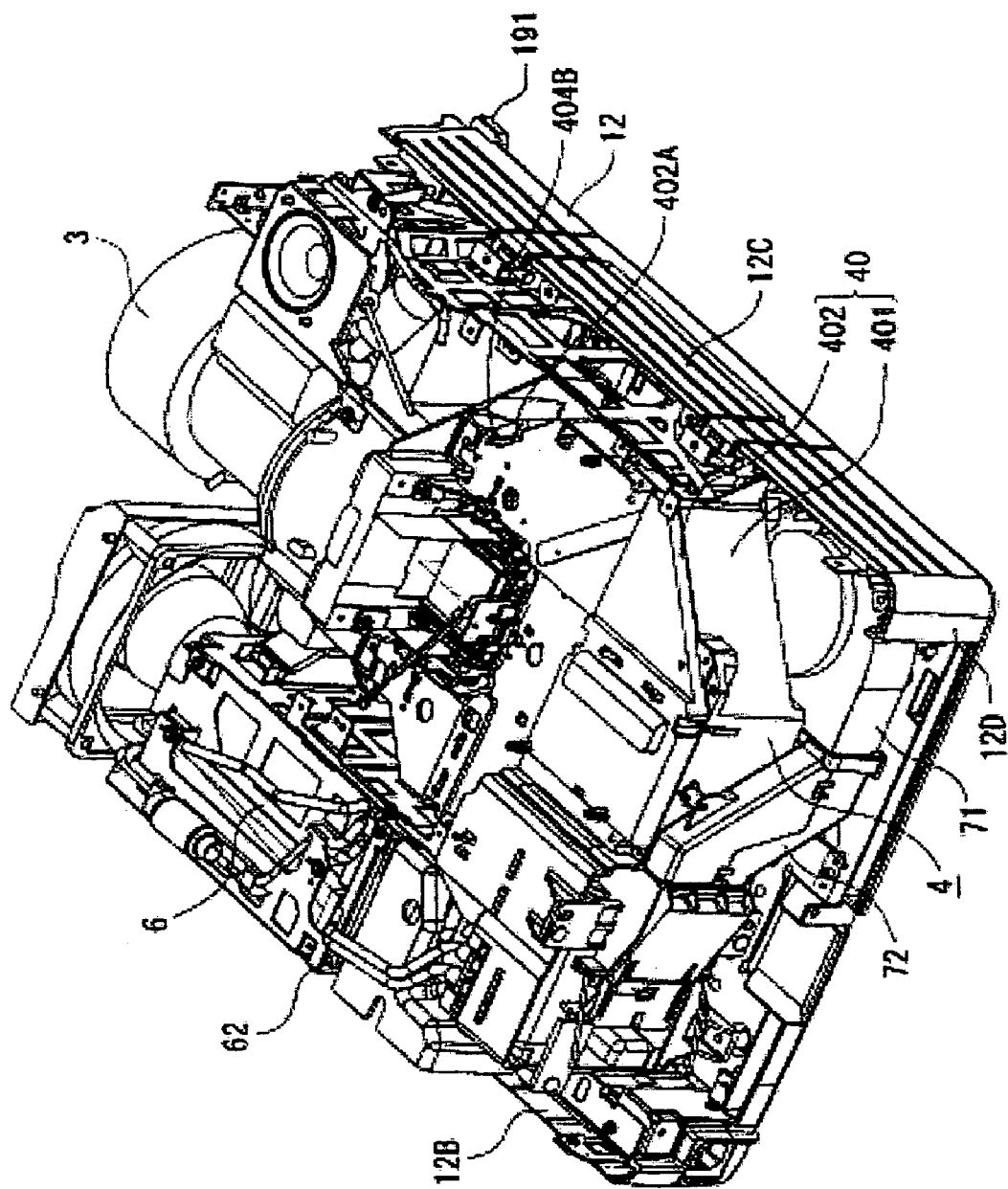

F I G. 1 2
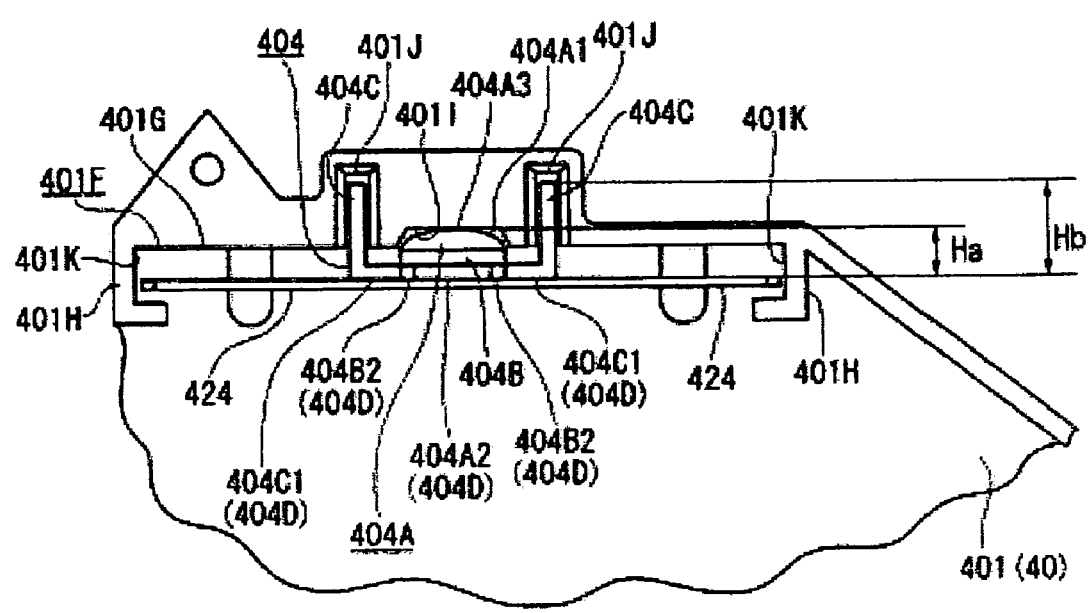

OPTICAL APPARATUS AND PROJECTOR

This application claims the benefit of Japanese Patent Application No. 2004-259830 filed Sep. 7, 2004. The entire disclosure of the prior application is hereby incorporated by reference herein in its entirety.

BACKGROUND

Aspects of the invention can relate to an optical apparatus and a projector. Related art projectors can include an optical apparatus having plural optical components, which are provided in an optical path of a light beams emitted from a light source, and a case for optical components, which can be included inside an illumination optical axis of the light beam, and which houses the plural optical components to arrange the same at a predetermined position. As the optical components, plural optical devices can be used for changing an optical characteristic of a light beams emitted from a light source, plural mirrors reflecting and/or being penetrated with a light beams emitted from a light source can also be used to guide the light beam to a predetermined illumination optical axis and the like.

In such a related art projector, difference in relative location of the optical device used as an optical component or in inclined location of a reflection surface of a mirror should be reduced or prevented from being generated in order to obtain a clearer projected image. A holding structure capable of adjusting a attitude of a mirror has been proposed for the purpose of the above. See, for example, Japanese Patent Application Publication 2000-321661.

In a mirror holding structure described in Japanese Patent Application Publication 2000-321661, a center part on the lower end side of a mirror is held so as to be sandwiched between one protruded portion formed into a case for optical components and a substantially U-shaped plate spring mounted by a fixing screw to the case for optical components. Further, two parts on the upper end side of the mirror are held so as to be sandwiched between two eccentric disks rotatably mounted to the case for optical components and the substantially U-shaped plate spring mounted by a fixing screw to the case for optical components. Independently rotating the respective eccentric disks an implement, such as a screwdriver, enables at least one of a vertical incline of the mirror and a horizontal incline of the mirror to be adjustable.

In the a mirror holding structure described in Japanese Patent Application Publication 2000-321661, however, two plate springs and two eccentric disks are required in order to set a mirror in the case for optical components. This causes a problem that the number of components becomes large, and thereby, a manufacturing cost is increased.

The above structure further requires an operation of respectively mounting the two plate springs and the two eccentric disks to the case for optical components in setting the mirror in the case for optical components. Moreover, the two eccentric disks should be rotated by means of an implement such as a screwdriver in order to adjust a attitude of the mirror. This causes a problem that an operator should carry out a troublesome operation in mounting a mirror or in adjusting a attitude of a mirror.

SUMMARY

An aspect of the invention can provide an optical apparatus and a projector, which are capable of reducing the number of components, and thereby, a manufacturing cost as well as easily mounting a reflection mirror and adjusting a attitude of a reflection mirror.

An optical apparatus in accordance with the invention is an optical apparatus that can include plural optical components including a reflection mirror provided in an optical path of a light beams emitted from a light source, a case for optical components including inside an illumination optical axis of the light beam for housing and holding the plural optical components in a predetermined position with respect to the illumination optical axis, a protruded part mounted to a back surface of a reflection surface of the reflection mirror, having a convex curved surface protruded to the outside of the surface of the reflection mirror and being in contact with the side wall when the reflection mirror is set along the side wall, and a pair of fixing parts respectively mounted to the back surface of the reflection surface of the reflection mirror so as to sandwich the protruded part therebetween and projecting to the outside of the reflection mirror. The case for optical components can be formed from a component housing member in the shape of a container having an opening through which the plural optical components are housed inside and a lid member for closing the opening of the component housing member. The reflection mirror is set along a side wall of the component housing member, and the side wall can be provided with a pair of fixing grooves extending along a direction of housing the reflection mirror in the component housing member, guiding movement of the pair of fixing parts in setting the reflection mirror in the component housing member and enabling the pair of fixing parts to be provided with play.

In the above context, the protruded part and the pair of fixing parts may be formed into one body or formed separately.

The protruded part and the pair of fixing parts can be first mounted to a back surface of a reflection surface of the reflection mirror. Then, the pair of fixing parts is inserted into the pair of fixing grooves formed in the side wall of the component housing member so that the pair of fixing parts would be guided by means of the pair of fixing grooves and moved to house the reflection mirror in the component housing member through an opening. The reflection mirror can be thus easily set in a predetermined position of the side wall. In this case, the protruded part can be in contact with the side wall since the pair of fixing parts is provided in the pair of fixing grooves with play. Moving the reflection mirror, for example, after the above with the protruded part being in contact with the side wall allows the reflection mirror to be three-dimensionally moved along the shape of the convex curved surface of the protruded part. This can contribute to easy adjustment of the attitude of the reflection mirror. Further, applying adhesive in a space between the pair of fixing parts and the pair of fixing grooves after adjusting the attitude of the reflection mirror allows the reflection mirror to be fixedly adhered to the side wall. Accordingly, setting of the reflection mirror and adjustment of a attitude of the reflection mirror can be easily performed as long as at least the protruded part and the pair of fixing parts are provided. This contributes to reduction in number of components, and thereby, manufacturing cost much more than the case of the mirror holding structure having been proposed up to the present.

Furthermore, mounting the protruded part and the pair of fixing parts to the back surface of the reflection surface of the reflection mirror in advance as described above also allows an operation of setting the reflection mirror in the component housing member to be easily carried out.

Moreover, applying adhesive in a space between the pair of fixing parts and the pair of fixing grooves to fix the reflection mirror to the side wall can allow the reflection mirror to be firmly fixed to the component housing member with a simple structure, so that the attitude of the reflection mirror can be maintained well.

Accordingly, reducing the number of components can allow a manufacturing cost to be reduced while setting of the reflection mirror and adjustment of a attitude of the reflection mirror can be easily performed without giving any troublesome operation to an operator. This is an advantage of the invention.

The exemplary optical apparatus can also include a mirror attitude adjusting lever mounted to the back surface of the reflection surface of the reflection mirror, extending along the back surface of the reflection mirror and projecting flat from an edge of the reflection mirror. The optical apparatus can include a mirror attitude adjusting lever projecting flat from an edge of the reflection mirror. Accordingly, gripping the mirror attitude adjusting lever with a hand, for example, to move the same allows the attitude of the reflection mirror to be further easily adjusted.

In the exemplary optical apparatus, the protruded part, the pair of fixing parts and the mirror attitude adjusting lever are preferably an integrally molded product. In accordance with this aspect, the protruded part, the pair of fixing parts and the mirror attitude adjusting lever can be an integrally molded product. This contributes to further reduction in number of components as well as easy performance of an operation of mounting the protruded part, the pair of fixing parts and the mirror attitude adjusting lever to the reflection mirror. That is to say, the mirror setting operation can be further easily carried out.

In the exemplary optical apparatus, it is preferable that the lid member is formed with an opening corresponding to a setting attitude of the reflection mirror and a top end of the mirror adjusting lever projects through the opening of the lid member when the reflection mirror is set in the case for optical components. The top end of the mirror attitude adjusting lever projects through the opening of the lid member with the component housing member being combined with the lid member. Accordingly, the mirror attitude adjusting lever projecting through the opening of the lid member can be moved, that is, the attitude of the reflection mirror can be adjusted even after setting all of the optical components in the component housing member to close the opening of the component housing member with the lid member. This enables manufacture of the optical apparatus to be completed after adjusting a attitude of the reflection mirror, and therefore, the optical apparatus can be rapidly manufactured.

In the exemplary optical apparatus, the protruded part and the pair of fixing parts are preferably formed so as to satisfy a relation of $Hb/2 \leq Ha < Hb$, wherein Ha is a height in a protruding direction of the protruded part and Hb is a length in a projecting direction of the pair of fixing parts. In the case that the protruded part and the pair of fixing parts are formed so as to satisfy a relation of $Ha < Hb/2$, the moving amount of the top ends of the pair of fixing parts increases during adjustment of the attitude of the reflection mirror. This easily causes mechanical interference of the top ends of the pair of fixing parts with an inner circumferential surface of the pair of fixing grooves in adjusting the attitude of the reflection mirror. The pair of fixing grooves should be formed large in groove shape in order to avoid the mechanical interference with the pair of fixing parts.

In accordance with the invention, the protruded part and the pair of fixing parts are formed so as to satisfy the relation of $Hb/2 \leq Ha < Hb$. Accordingly, the moving amount of the top ends of the pair of fixing parts in adjusting the attitude of the reflection mirror can be reduced much more than the case that the protruded part and the pair of fixing parts are formed so as to satisfy the above-mentioned relation of $Ha < Hb/2$. This allows the mechanical interference of the top ends of the pair of fixing parts with the inner circumferential surface of the pair of fixing grooves to be avoided in adjusting the attitude of the reflection mirror, so that the attitude of the reflection mirror can be smoothly adjusted with high precision. The pair of fixing grooves is also not necessary to be formed large in groove shape for the purpose of avoiding the mechanical interference with the pair of fixing parts.

In the exemplary optical apparatus, the pair of fixing grooves is preferably formed so as not to interfere with the lid member on a plane when the component housing member is combined with the lid member. The pair of fixing grooves can be formed so as not to interfere with the lid member on a plane when the component housing member is combined with the lid member. Accordingly, adhesive can be applied to a space between the pair of fixing parts and the pair of fixing grooves in adjusting the attitude of the reflection mirror to fix the reflection mirror to the component housing member even after setting all of the optical components in the component housing member to close the opening of the component housing member with the lid member. This enables manufacture of the optical apparatus to be completed after adjusting the attitude of the reflection mirror to fix the reflection mirror to the component housing member, and therefore, the optical apparatus can be rapidly manufactured.

In the exemplary optical apparatus, the side wall is preferably formed with mirror housing grooves extending in a plane direction of the reflection mirror so that the reflection mirror can be inserted or extracted therein or therefrom. The side wall can be formed with mirror housing grooves. Accordingly, sliding the reflection mirror along the mirror housing grooves allows the reflection mirror to be set in a predetermined position, so that the reflection mirror setting operation can be further easily performed.

An exemplary projector can be a projector including an optically modulating apparatus for modulating a light beams emitted from a light source in accordance with image information to form an optical image and a projection optical apparatus for magnifying and projecting the optical image formed in the optically modulating apparatus, the projector comprising the above-mentioned optical apparatus.

The projector can include the above-mentioned optical apparatus, so that an operation and an effect similar to those of the optical apparatus can be achieved.

BRIEF DESCRIPTION OF THE DRAWINGS

The invention will be described with reference to the accompanying drawings, wherein like numbers reference like elements, and wherein:

FIG. 5 is a perspective view of an inner part of the projector in the exemplary embodiment;

FIG. 12 is a plan view from the upper side of the holding structure of the reflection mirror in the exemplary embodiment;

DETAILED DESCRIPTION OF EMBODIMENTS

Exemplary embodiments of the invention will be described hereinafter on the basis of the drawings.

Figure 1:
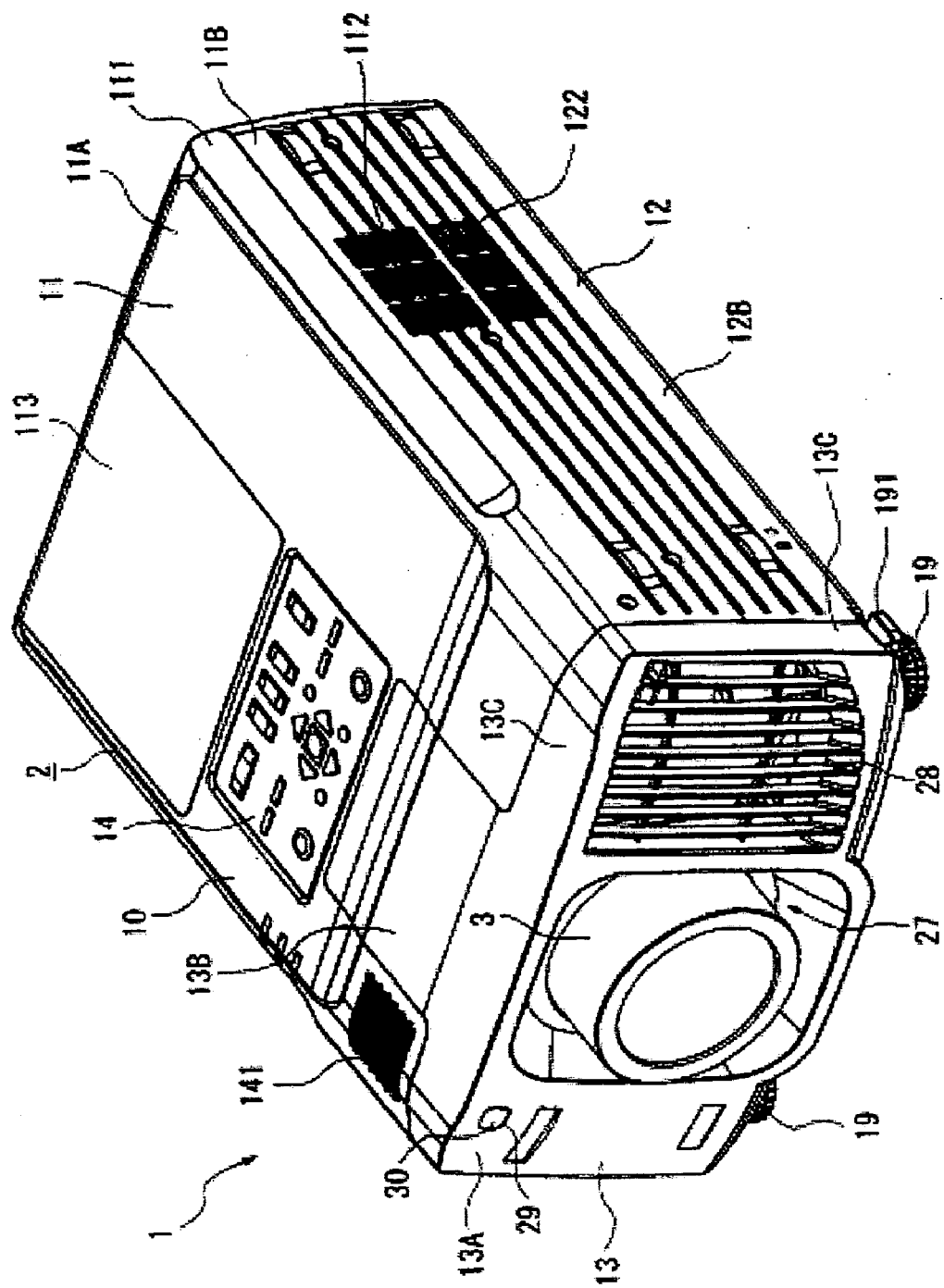
FIG. 1 is a perspective view from the upper side of a whole projector comprising an optical apparatus in an exemplary embodiment.
Figure 2:
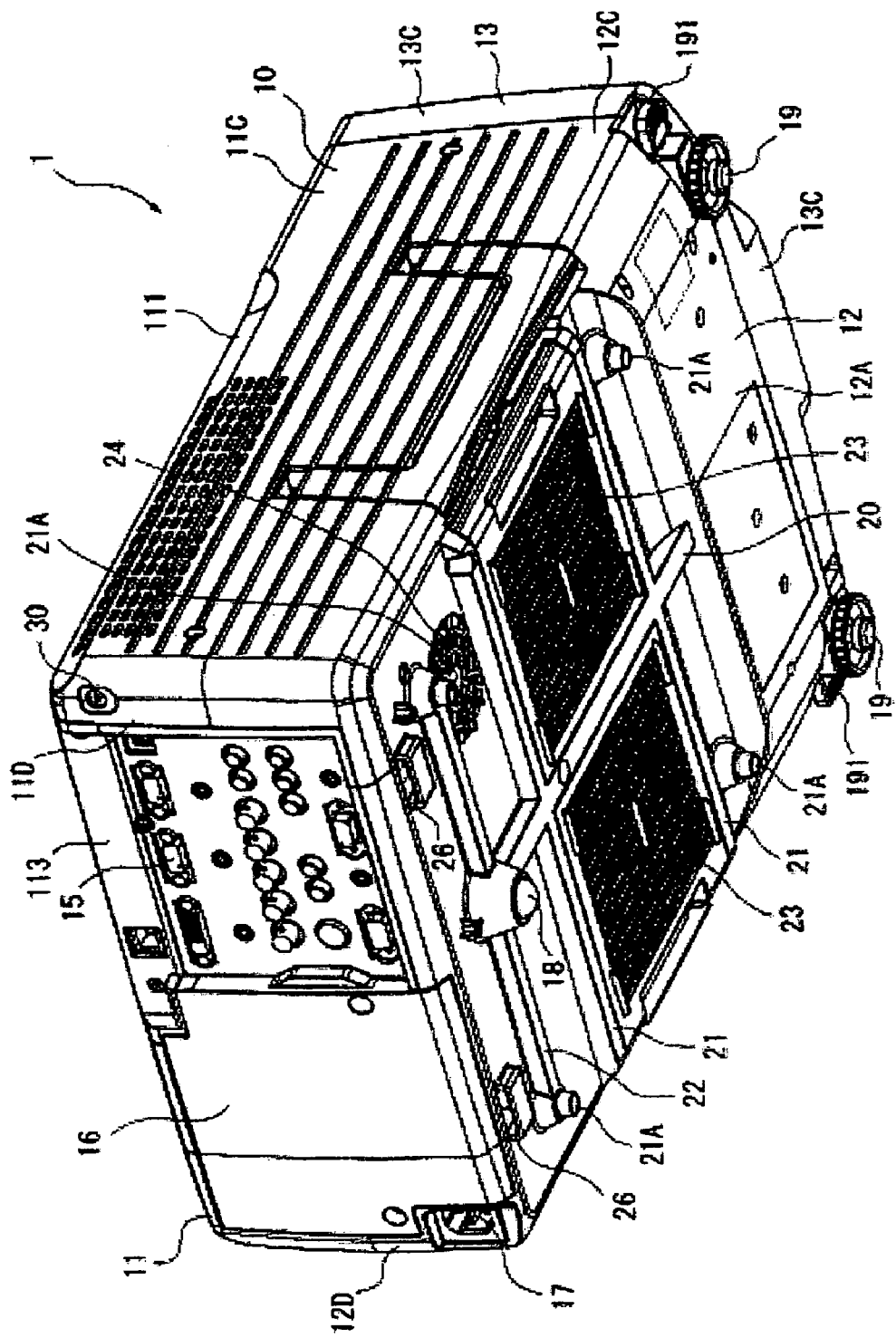
FIG. 2 is a perspective view from the lower part of the whole projector in the exemplary embodiment.

FIGS. 1 and 2 show a projector 1 including an optical apparatus in accordance with the invention. FIG. 1 is a perspective view from the upper front side. FIG. 2 is a perspective view from the lower back side.

The projector 1 is an optical instrument for modulating a light beams emitted from a light source in accordance with image information to magnify and project the modulated light beam on a projection surface, such as a screen. The projector 1 can include an external case 2 for housing inside an apparatus body including a later-mentioned optical apparatus and a projecting lens 3, which is exposed through the external case 2. The projector 1 is to be installed in a large store, a public space and the like to display a projected image on a large screen for the purpose of providing many observers with picture information.

The projecting lens 3 has a function as a projection optical apparatus for magnifying and projecting an optical image formed by modulating a light beams emitted from a light source in accordance with image information by a liquid crystal panel used as a later-mentioned optically modulating apparatus. The projecting lens 3 is arranged to be a set lens in which plural lenses are housed in a cylindrical tube.

The external case 2 is in the shape of a rectangular parallelepiped whose depth in a projecting direction is larger than a dimension in an axial direction orthogonal to the depth. The external case 2 comprises a plane body 10 for covering a main body of the apparatus and a frame body not shown for securing the strength of the case.

The plane body 10 can include an upper case 11 for covering an upper part of the main body of the apparatus, a lower case 12 for covering a lower part of the main body of the apparatus and a front case 13 for covering a front part of the main body of the apparatus. The respective cases 11 to 13 are an integrally molded product, which is formed by injection molding or the like and which is made of synthetic resin.

The upper case 11 can include an upper surface of the case 11A for covering the upper part of the main body of the apparatus, side surfaces of the case 11B and 11C substantially extending downward from width directionally ends of the upper surface of the case 11A and a back surface of the case 11D substantially extending downward from the rear end of the upper surface of the case 11A.

Ridge lines where the upper surface of the case 11A and the side surfaces of the case 11B and 11C of the upper case 11 intersect are beveled from the substantially center part of the projector 1 in the projecting direction to the rear end side. A concave 111 recessed into the shape of a concave is formed along the ridgeline. The concave 111 is formed for inserting a pipe-shaped supporting member for connecting two projectors 1 when the two projectors 1 are stacked up. Furthermore, the side surface of the case 11B is provided with slit-shaped openings 112 for introducing cooling air.

The upper surface of the case 11A is provided at the substantially center part thereof with an operation panel 14 for carrying out starting and adjusting operations of the projector 1. The operation panel 14 comprises plural switches including a start switch and an adjusting switch for image, sound and the like. Operating the adjusting switch or the like of the operation panel 14 during projection by means of the projector 1 allows an image, sound and the like to be adjusted.

The upper surface of the case 11A is also provided at the front part thereof in the projecting direction with plural holes 141. A speaker for outputting sound is housed on the inner side of the holes 141.

The operation panel 14 and the speaker are electrically connected to a later-mentioned controlling substrate forming the main body of the apparatus. An operation signal from the operation panel 14 is processed by means of the controlling substrate.

The back surface of the case 11D is formed into the shape of a frame having the front almost opening. In the opening part, provided is a bare connector group 15 for inputting an image signal and such. Another opening part next to the above opening is for housing a light source unit and usually covered with a lid member 16 for housing the light source unit. The connector group 15 is electrically connected to the later-mentioned controlling substrate. An image signal inputted through the connector group 15 is processed by means of the controlling substrate.

A lid member 113, which is detachable from the upper case 11, is mounted to the rear end of the upper surface of the case 11A and the upper end of the back surface of the case 11D. It is arranged that an expansion substrate such as a LAN board can be inserted inside the lid member 113.

The lower case 12 is formed substantially symmetrically to the upper case 11 with respect to a connecting surface with the upper case 11. The lower case 12 comprises a bottom surface of the case 12A, side surfaces of the case 12B and 12C and a back surface of the case 12D.

The side surfaces of the case 12B and 12C and the back surface of the case 12D are connected at the upper ends thereof with the lower ends of the side surfaces of the case 11B and 11C and the back surface of the case 11D of the upper case 11. The back surface of the case 12D has the front almost opening similarly to the back surface of the case 11D of the upper case 11. In an opening part of the connected back surfaces, provided is the above-mentioned bare connector group 15 while the lid member 16 is mounted so as to bridge the both openings.

Another opening is formed at a corner of the back surface of the case 12D. An inlet connector 17 is provided nakedly in the opening. The side surface of the case 12B is provided with further openings 122 in a place corresponding to the openings 112 formed in the side surface of the case 11B of the upper case 11.

The bottom surface of the case 12A is provided with a fixed leg 18 at the substantially center part on the rear end side of the projector 1 as well as an adjustment legs 19 at the both ends in the width direction on the front end side.

The adjustment leg 19 is formed from a shaft-shaped member, which projects from the bottom surface of the case 12A toward the outside of the surface so as to be able to freely move back and forth. The shaft-shaped member per se is housed inside the external case 2. An amount of the movement of such an adjustment leg 19 from the bottom surface of the case 12A can be adjusted by operating an adjustment button 191 provided in the side surface of the projector 1.

This allows a vertical location of a projected image projected from the projector 1 to be adjusted so as to form the projected image at a proper location.

Further, in the bottom surface of the case 12A, formed are a convex rib portion 20, which is provided at the substantially center part of the bottom surface of the case 12A and which extends in the projecting direction, and plural rib portions 21 and 22, which extend in the width direction of the projector 1 so as to be orthogonal to the rib portion 20. An inhale opening for taking in cooled air from the outside is formed between the two rib portions 21 provided at the center part, as described later in detail. The inhale opening is covered with a filter 23. An inhale opening 24 also for taking in cooled air is formed on the rear end side of the inhale opening covered with the filter 23. The inhale opening 24 is not arranged to be covered with a filter.

Four screw holes 21A are formed at the ends of the rib portions 21 and 22 extending in the width direction of the projector 1. Metal parts for suspension from the ceiling are to be fitted in the screw holes 21A in the case that the projector 1 is suspended from the ceiling.

Moreover, the bottom surface of the case 12A is provided with connecting parts 26 at an edge thereof on the rear end side of the apparatus. A cover member for covering the above-mentioned connector group 15 to prevent dust or the like from adhering the connector group 15 is arranged to be mounted to the connecting parts 26.

The front case 13 can include a front surface 13A and an upper surface 13B. A rib 13C extending toward the outside of the front surface 13A is formed on an outer circumferential part of the front surface 13A. The rib 13C is connected with the front end in the projecting direction of the upper case 11 and the lower case 12.

The front surface 13A is inclined toward the rear end side of the apparatus from the bottom surface of the case 12A of the lower case 12 to the upper surface of the case 11A of the upper case 11. The front surface 13A is inclined in a direction that it goes away from a projection surface. This is for the purpose of difficult adhesion of dust to the front case 13 by arranging the front surface 13A of the front case 13 to face downward when the projector 1 is suspended from the ceiling. In such arrangement, a case of suspension from the ceiling, which is more difficult in maintenance than the usual installation, is taken into account.

An opening 27 is formed at the substantially center part of the front surface 13A mentioned above. The projecting lens 3 is nakedly provided in the opening 27.

Slit-shaped openings 28 are provided adjacently to the opening 27. Air having cooled the inside of the main body of the apparatus of the projector 1 is discharged from the openings 28.

In the vicinity of a corner of the front surface 13A, formed is a hole 29. A light receiving part 30 for receiving an operation signal of a remote controller not shown in the drawings is provided inside the hole 29.

In the exemplary embodiment, the light receiving part 30 is also provided on the back surface side of the projector 1. The light receiving part 30 is also located at a corner of the back surface of the case 11D of the upper case 11, as shown in FIG. 2. This allows an operation signal from a remote controller to be received from any of the front and back sides of the apparatus in the case of using the remote controller.

The upper surface 13B extends to the substantial center of the upper surface of the case 11A of the upper case 11 and reaches the vicinity of a base end of the projecting lens 3 although this is not shown in the drawings concretely. Such arrangement is for enabling the projecting lens 3 to be replaced only by detaching the front case 13 in changing the projecting lens 3. It is arranged that detaching the front case 13 from the upper case 11 and the lower case 12 allow the upper surface 13B to be released and opened, so that a mounting part of the base end of the projecting lens 3 is revealed.

Figure 3:
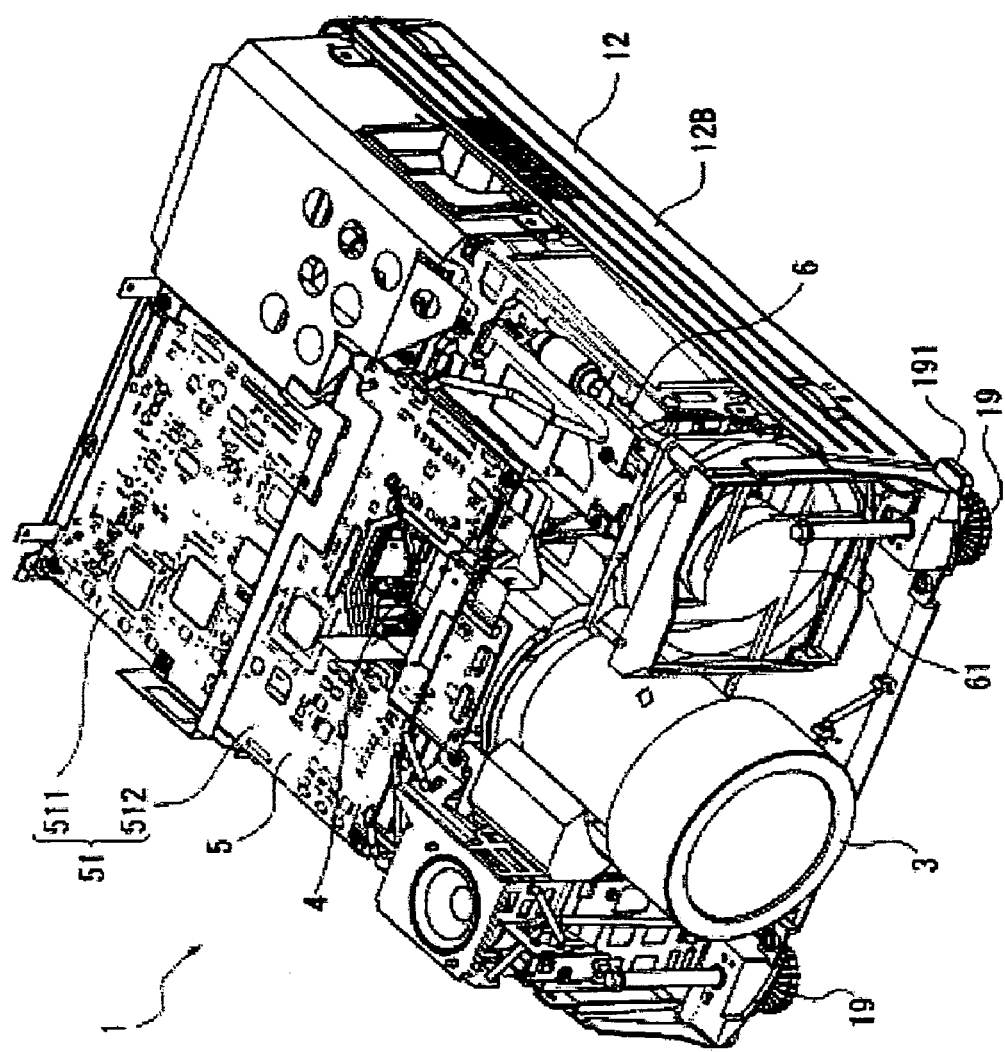
FIG. 3 is a perspective view of an inner part of the projector in the exemplary embodiment.
Figure 4:
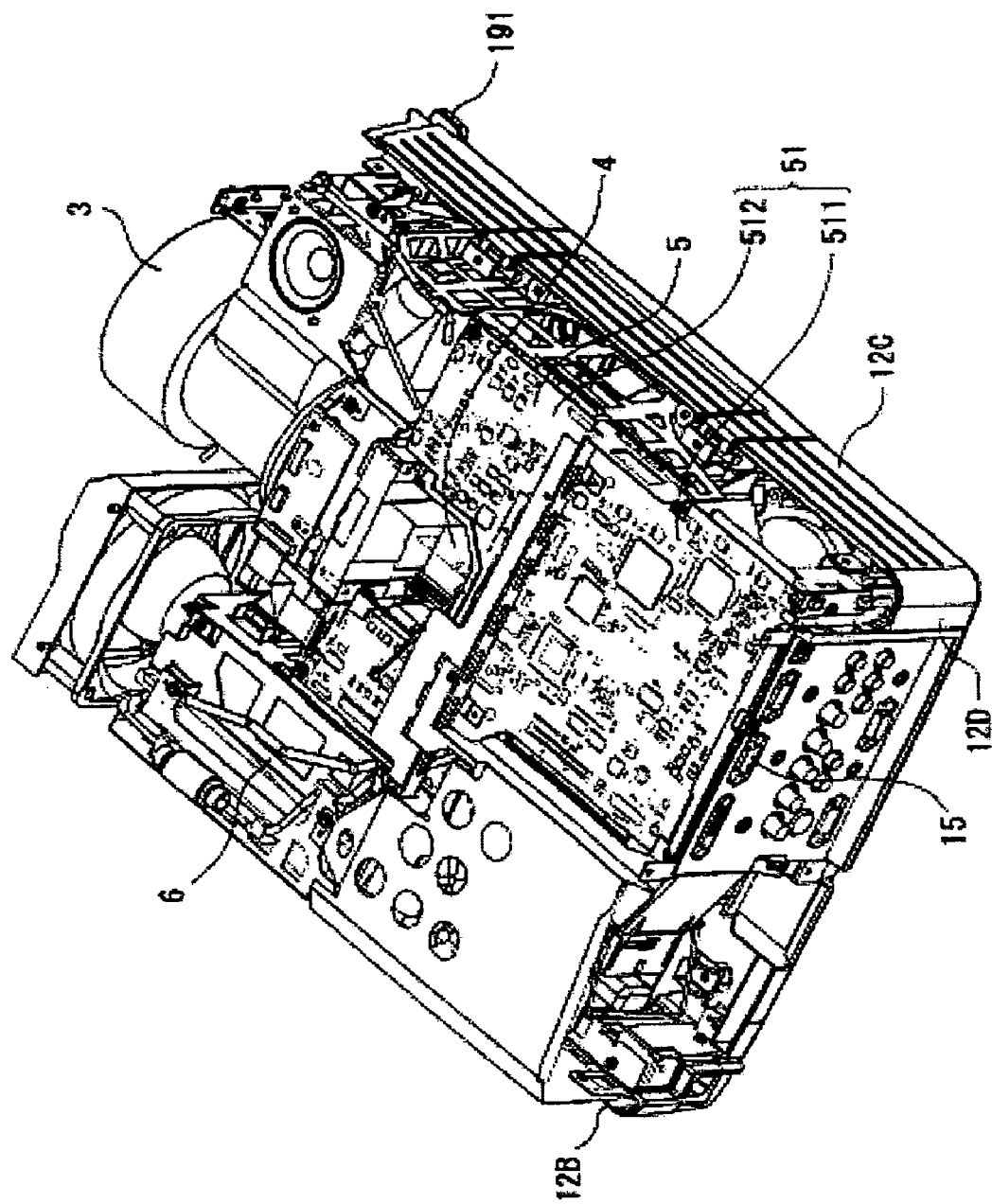
FIG. 4 is a perspective view of an inner part of the projector in the exemplary embodiment.

FIGS. 3 to 5 are perspective views of the inside of the projector 1. As shown in FIGS. 3 to 5, a main body of the apparatus of the projector 1 is housed in the above-mentioned external case 2. The main body of the apparatus can include an optical unit 4 (FIG. 5) used as an optical apparatus, a controlling substrate 5 and a power supply block 6.

Figure 6:
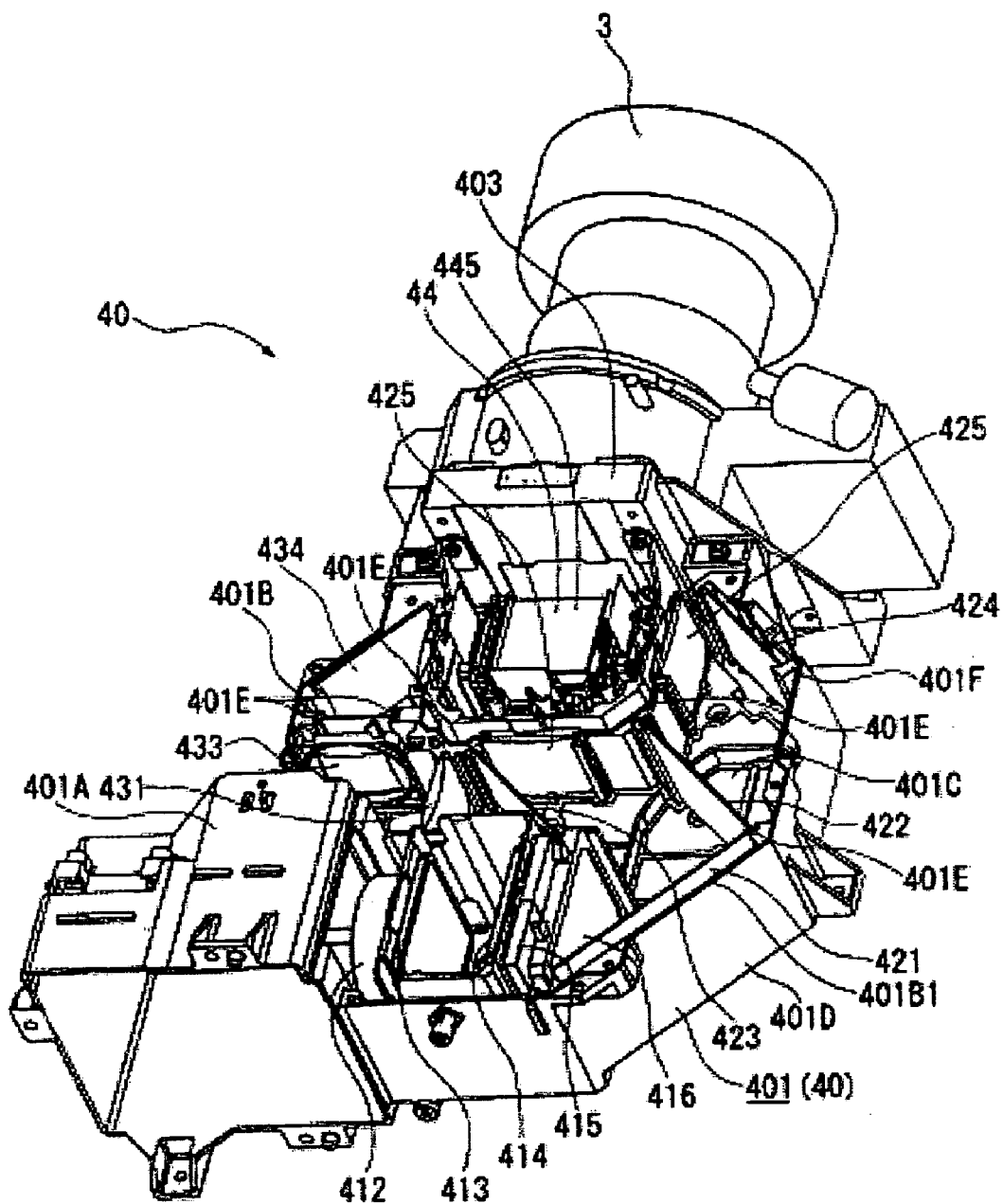
FIG. 6 is a perspective view of an inner part of an optical unit in the exemplary embodiment.
Figure 7:
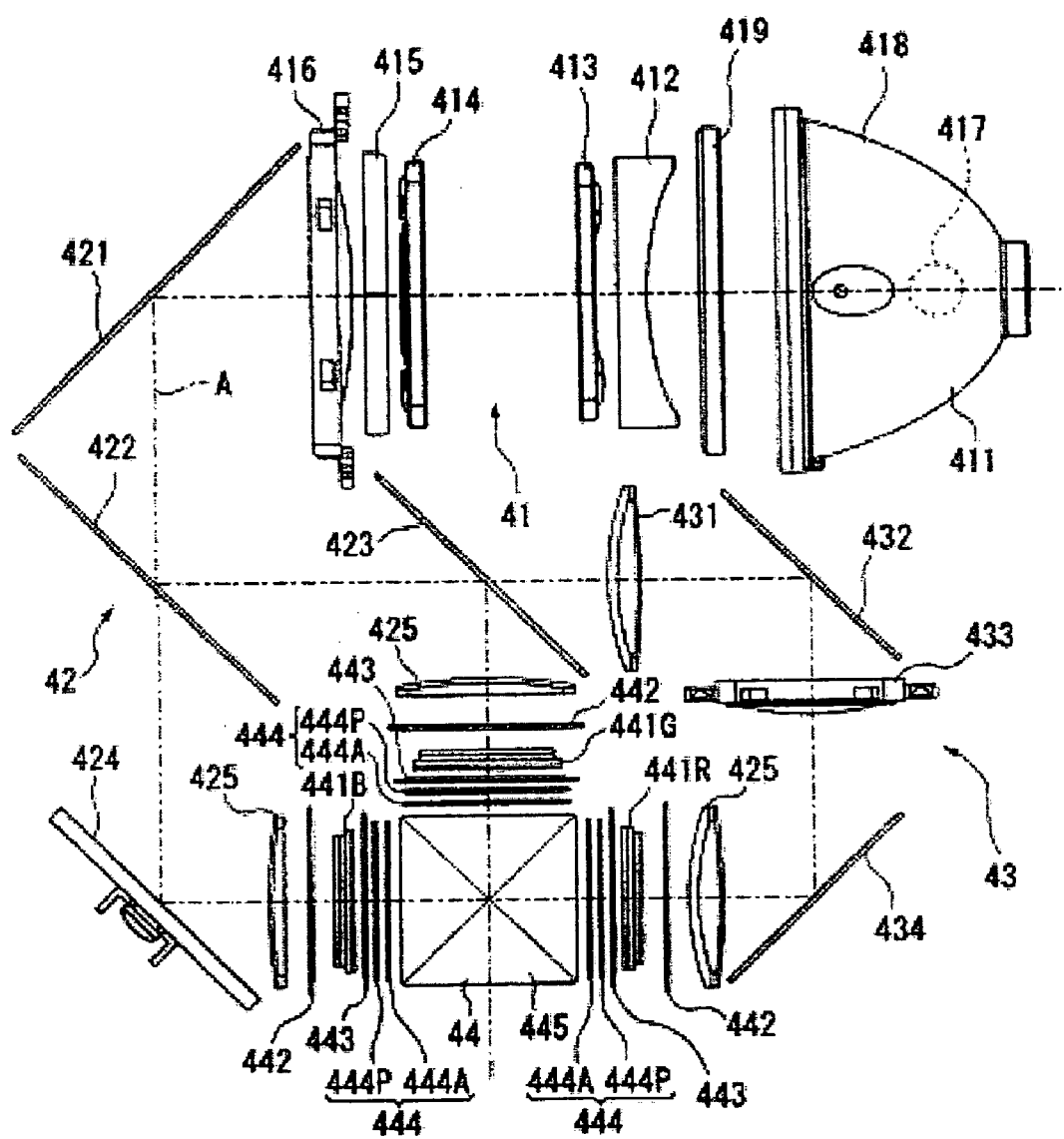
FIG. 7 is a simplified view of an optical system of the optical unit in the exemplary embodiment.

FIG. 6 is a perspective view of the inside of the optical unit 4. FIG. 7 is a simplified view of an optical system of the optical unit 4. The optical unit 4 modulates a light beams emitted from the light source unit in accordance with image information to form an optical image, and then, forms a projected image on a screen through the projecting lens 3. As shown in FIG. 7, the optical unit 4 is roughly divided in accordance with functions into an integrator illumination optical system 41, a color dividing optical system 42, relay optical system 43, an electro-optical apparatus 44 formed into one body from the optically modulating apparatus and a color composite optical system and a case for optical components 40 (FIGS. 5 and 6) used as a case for optical components for housing the above optical components 41 to 44. The optical unit 4 in the embodiment is one that is used for a three-plates type of projector. The optical unit 4 is arranged to be a space color dividing type of optical unit for dividing white light projected from the light source into light in three colors in the case for optical components 40.

The integrator illumination optical system 41 is an optical system for evening illumination of the light beams emitted from the light source on an illumination optical axis orthogonal plane. The integrator illumination optical system 41 can include a light source unit 411, a parallelizing concave lens 412, a first lens array 413, a second lens array 414, a polarization converting device 415 and a superimposing lens 416.

The light source unit 411 can include a light source lamp 417 used as a radiation light source, a reflector 418 and a front glass 419 for covering a light beam projecting surface of the reflector 418. In the light source unit 411, the radiate light beam projected from the light source lamp 417 is reflected on the parallelizing concave lens 412 and the reflector 418 to be a substantially parallel light beam and projected outward. A high pressure mercury lamp is used as the light source lamp 417 in the embodiment, but a metal halide lamp or a halogen lamp is used in some cases other than the above. Further, it is arranged in the embodiment that the parallelizing concave lens 412 be provided on a projecting surface of the reflector 418 consisting of an ellipsoidal mirror. A paraboloidal mirror, however, may be also used as the reflector 418.

The first lens array 413 is arranged so that small lenses having an almost rectangular outline in the view of the illumination optical axis direction would be arranged in a matrix. The respective small lenses divide a light beams emitted from the light source lamp 417 into partial light beam to project the partial light in the illumination optical axis direction.

The second lens array 414 is arranged so that small lenses would be arranged in a matrix. The second lens array 414 has a function of forming an image from each small lens of the first lens array 413 on liquid crystal panels 441R, 441G and 441B together with the superimposing lens 416.

The polarization converting device 415 is for converting light from the second lens array 414 into polarized light in a fixed direction. This enhances a rate of using light in the electro-optical apparatus 44.

Each partial light beam having been converted into one kind of polarized light by the polarization converting device 415 is almost superimposed on the liquid crystal panels 441R, 441G and 441B of the electro-optical apparatus 44 by the superimposing lens 416 finally. In the projector using the liquid crystal panels 441R, 441G and 441B of the type that polarized light is modulated, only one kind of polarized light can be used and substantially half of the light beam from the light source lamp 417 emitting random polarized light is not used. Accordingly, the polarization converting device 415 is used for converting all light beam projected from the light source lamp 417 into one kind of polarized light so as to increase efficiency in using light in the electro-optical device 44. Such a polarization converting device 415 is introduced in Japanese Patent Application Publication H08-304739, for example.

The color dividing optical system 42 can include a reflection mirror 421 for bending the light beams emitted from the integrator illumination optical system 41, two dichroic mirrors 422 and 423 and a reflection mirror 424. The color dividing optical system 42 has a function of dividing the plural partial light beam projected from the integrator illumination optical system 41 by means of the dichroic mirrors 422 and 423 into light in three colors of red (R), green (G) and blue (B). The reflection mirror 424, which will be described later in detail, is arranged so that a direction thereof can be adjusted with respect to a component housing member 401.

The relay optical system 43 can include an incident side lens 431, a relay lens 433 and reflection mirrors 432 and 434. The relay optical system 43 has a function of introducing red light, which is the light in colors divided by means of the color dividing optical system 42, to the liquid crystal panel 441R.

In the above case, the dichroic mirror 422 of the color dividing optical system 42 reflects a red light component and a green light component in the light beams emitted from the integrator illumination optical system 41 while it is permeated with a blue light component. The blue light having permeated the dichroic mirror 422 is reflected on the reflection mirror 424 to reach the liquid crystal panel 441B for the blue color through a field lens 425. The field lens 425 is for converting each partial light beams emitted from the second lens array 414 into a light beam parallel to a center axis (a main light beam) of the partial light beam. This is true of other field lenses 425 provided on the light-incident sides of the liquid crystal panels 441G and 441R.

Further, the green light of the red and green light reflected on the dichroic mirror 422 is reflected on the dichroic mirror 423 to reach the liquid crystal panel 441G for the green color through the field lens 425. On the other hand, the red light permeates the dichroic mirror 423, passes through the relay optical system 43 and further passes through the field lens 425 to reach the liquid crystal panel 441R for the red color.

The relay optical system 43 is used for the red color for the purpose of preventing efficiency in using light from being deteriorated by radiation of light or the like since the optical path of the red color is longer than that of the other light in colors. That is to say, using the relay optical system 43 allows the partial light beam incident on the incident side lens 431 to be transmitted to the field lens 425 as it is. It is arranged in the embodiment that the red light of the light in three colors pass through the relay optical system 43. It should be understood that the invention, however, is not limited to the above. It may be arranged that the blur light pass through the relay optical system 43, for example.

Figure 8:
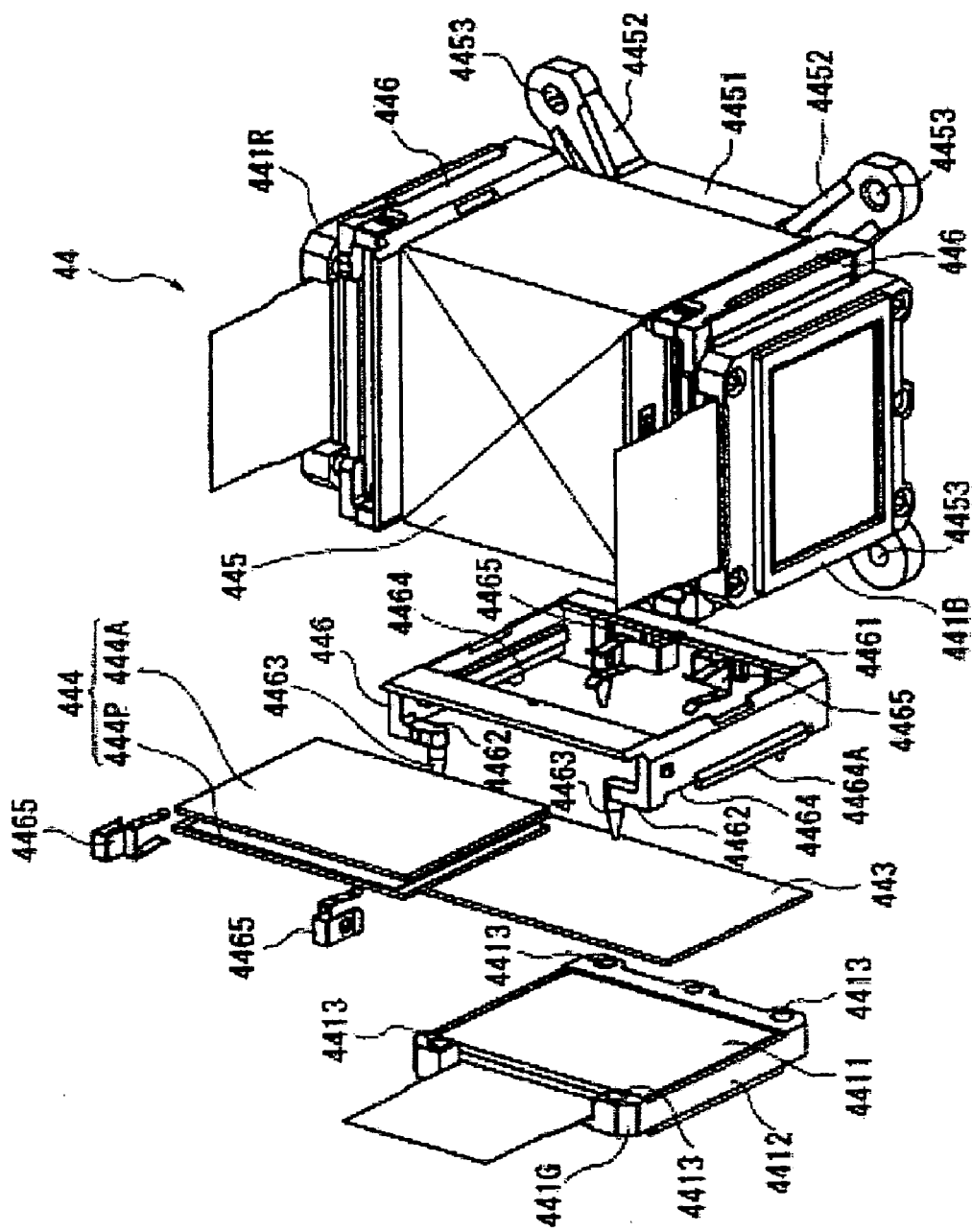
FIG. 8 is an exploded perspective view of an electro-optical apparatus in the exemplary embodiment.

FIG. 8 is an exploded perspective view of the electro-optical apparatus 44. The electro-optical apparatus 44 is for modulating an incident light beam in accordance with image information to form a color image. The electro-optical apparatus 44 comprises three incident side polarizing plates 442 on which light in respective colors divided in the color dividing optical system 42 is incident, liquid crystal panels 441R, 441G and 441B used as an optical modulating apparatus provided on the latter side of the respective incident side polarizing plates 442, an angle-of-view corrector plate 443 and a projecting side polarizing plate 444, which are provided on the latter side of the respective liquid crystal panels 441R, 441G and 441B, and a cross dichroic prism 445 used as a color composite optical system.

The liquid crystal panels 441R, 441G and 441B are formed from a polysilicon TFT, for example, used as a switching device. In the case of the liquid crystal panel 441G, for example, the liquid crystal panel 441G comprises a panel main body 4411 and a holding frame 4412 for housing the panel main body 4411, as shown in FIG. 8. The liquid crystal panels 441R and 441B have a structure substantially same as that of the liquid crystal panel 441G although the following description will not particularly mention the liquid crystal panels 441R and 441B.

The panel main body 4411 is formed by sealing liquid crystal in a pair of transparent substrates provided oppositely each other though this is omitted from the drawings. On an incident side and a projecting side of the pair of transparent substrates, adhered is dust-proofing glass.

The holding frame 4412 is a member including a concave for housing the panel main body 4411. The holding frame 4412 is provided on its four corners with halls 4413.

The incident side polarizing plate 442 (FIG. 7), which is provided in the former side of the liquid crystal panels 441R, 441G and 441B, is permeated only with polarized light of the light in colors divided in the color dividing optical system 42, the polarized light going in a fixed direction, and absorbs the other light beam. The incident side polarizing plate 442 is formed from a substrate made of sapphire glass or the like with a polarizing film adhered thereon. The polarizing film may be adhered on the field lens 425 without using a substrate.

The angle-of-view corrector plate 443 is formed on a substrate by forming an optically converting film having a function of correcting an angle of view of an optical image formed in the liquid crystal panel 441G. Providing such an angle-of-view corrector plate 443 allows a leak of light in a black screen to be reduced and a contrast of a projected image to be greatly improved.

The projecting side polarizing plate 444 is permeated only with polarized light of the light beam optically modulated in the liquid crystal panel 441G, the polarized light goes in a predetermined direction, and absorbs the other light beam. The projecting side polarizing plate 444 comprises two of a first polarizing plate (pre-polarizer) 444P and a second polarizing plate (analyzer) 444A in the embodiment. The projecting side polarizing plate 444 is formed from two plates as described above in order to proportionally divide and absorb the incident polarized light by means of the first polarizing plate 444P and the second polarizing plate 444A, respectively, to proportionally divide heat generated from the polarized light by means of the both polarizing plates 444P and 444A, and thereby, keep down overheat of the respective plates.

The cross dichroic prism 445 composes an optical image, which is projected from the projecting side polarizing plate 444 and modulated for light in respective colors, to form a color image.

The cross dichroic prism 445 is provided with a dielectric multi-layer film for reflecting the red light and a dielectric multi-layer film for reflecting the blue light, which are arranged substantially in the shape of X along surfaces of four right-angled prisms. The dielectric multi-layer films are used for composing the light in three colors.

On the lower surface of the cross dichroic prism 445, fixedly adhered is a prism fixing plate 4451 by means of an ultraviolet curing adhesive. The prism fixing plate 4451 comprises legs 4452 extending along a diagonal of the cross dichroic prism 445. On a top end of each leg 4452, formed is a hall 4453.

The electro-optical apparatus 44 is fixedly connected to a horizontal part of the L-shaped head body 403 by screws or the like, which are inserted in the halls 4453 but not shown in the drawings.

The above-mentioned liquid crystal panel 441G, the angle-of-view corrector plate 443, the first polarizing plate 444P and the second polarizing plate 444A are fixed on a light beam incident end surface of the cross dichroic prism 445 via a panel fixing plate 446.

The panel fixing plate 446 can include a fixing part main body 4461 substantially in the shape of C in the plane view and pins 4463 projectingly provided on the top end side of the fixing part main body 4461 via arms 4462. At the top end of the C of the fixed part main body 4461, formed are a pedestal 4464 on which the angle-of-view corrector plate 443 is fixed and a positioning portion 4464A, which extends along an edge on the top end side of the C and which is used as an appearance position reference of the angle-of-view corrector plate 443.

When the liquid crystal panel 441G, the angle-of-view corrector plate 443, the first polarizing plate 444P and the second polarizing plate 444A are fixed on a light beam incident end surface of the cross dichroic prism 445 via the panel fixing plate 446, the first polarizing plate 444P and the second polarizing plate 444A are first inserted in a space inside the C of the fixing part main body 4461. The first polarizing plate 444P and the second polarizing plate 444A are then urged so as to be arranged with a fixed space therebetween by a spring member 4465 and are fixed in the space.

Then, an appearance position of the angle-of-view corrector plate 443 is adjusted by means of the positioning portion 4464A while the end surface of the angle-of-view corrector plate 443 is adhered on the pedestal 4464 by thermal conductive tape, adhesive or the like. Following to the above, the panel fixing plate 446 is fixed to the light beam incident end surface of the cross dichroic prism 445.

After applying ultraviolet curing adhesive to the pins 4463 of the panel fixing plate 446, the pins 4463 are inserted into the halls 4413 of the liquid crystal panel 441G before the adhesive is stiffened.

In the same process, the liquid crystal panels 441R and 441B are also temporally fixed to the panel fixing plate 446 before the ultraviolet curing adhesive is stiffened. Then, the light in the respective colors of red, green and blue is introduced into the respective liquid crystal panels 441R, 441G and 441B. The relative positions of the liquid crystal panels 441R, 441G and 441B are adjusted with the light in the respective colors projected from the light beam projecting end surface of the cross dichroic prism 445 being observed. After the adjustment is completed, the ultraviolet ray is radiated on the ultraviolet curing adhesive to carry out positioning and fixing of the liquid crystal panels 441R, 441G and 441B.

The case for optical components 40 comprises the component housing member 401 and a lid member 402 for closing an opening of the component housing member 401, as shown in FIG. 5 or 6. The component housing member 401 and the lid member 402 are synthetic resin products formed by injection molding or such.

The component housing member 401 comprises a later-mentioned light source housing portion 401A for housing a light source unit and a component housing portion 401B for housing optical components, as shown in FIG. 6. The component housing portion 401B is formed into the shape of a container having an opening 401B1 on the upper part thereof, the upper part being formed from a bottom surface 401C and a side wall 401D. The side wall 401D is provided with plural grooves 401E and a reflection mirror setting portion 401F for setting the reflection mirror 424 therein. Various kinds of optical component other than the reflection mirror 424 are slidably fitted in the grooves 401E from the upper side through the opening 401B1. The reflection mirror setting portion 401F is where the reflection mirror 424 is set. Description of the reflection mirror setting portion 401F will be given at the same time as that of a holding structure of the reflection mirror 424. The grooves 401E and the reflection mirror setting portion 401F allow the respective optical components to be precisely provided in an illumination optical axis A (FIG. 7) defined in the case for optical components 40.

The lid member 402 has a flat shape corresponding to the component housing member 401, as shown in FIG. 5. The lid member 402 is formed as a lid member for closing the opening 401B1 of the component housing portion 401B. Further, the lid member 402 is provided with plural openings such as an opening 402A for exposing a part of a later-mentioned mirror attitude adjusting member, which enables a attitude of the reflection mirror 424 to be adjustable, to the outside of the optical unit 4, for example.

The head body 403, which is made of metal and whose side surface is substantially in the shape of L, is provided at a light beam projecting side end of the component housing member 401. The electro-optical apparatus 44 is mounted to the horizontal part of the L of the head body 403 while the base end of the projecting lens 3 is fixedly connected to a vertical part of the L.

The controlling substrate 5 is provided so as to cover the upper part of the optical unit 4, as shown in FIGS. 3 and 4. The controlling substrate 5 can include a main substrate 51 formed from two laminated layers. On an upper substrate 51A, mounted is a controlling portion main body, such as a processing unit. Driving ICs of the respective liquid crystal panels 441R, 441G and 441B are mounted on a lower substrate 51B. The controlling substrate 5 comprises an interface substrate, which is connected on the rear end side of the main substrate 51 and which rises on the back surfaces of the case 11D and 12D of the external case 2 although this is not shown in the drawings.

On the back surface of the interface substrate, mounted is the above-mentioned connector group 15. Image information inputted from the connector group 15 is outputted to the main substrate 51 through the interface substrate.

The processing unit on the main substrate 51 outputs a controlling instruction to the liquid crystal panel driving IC after processing the inputted image information. The driving IC generates and outputs a driving signal on the basis of the controlling instruction to drive the liquid crystal panel 441, and thereby, optical modulation is carried out in accordance with the image information to form an optical image.

The power supply block 6 is provided adjacently to the optical unit 4 and extends in the projecting direction of the external case 2 of the projector 1. The power supply block 6 can include a power supply unit and a lamp driving unit, which are omitted from the drawings.

The power supply unit is for supply the lamp driving unit, the controlling substrate 5 and the like with power supplied from the outside through a power supply cable connected to the above-mentioned inlet connector 17.

The lamp driving unit is a converting circuit for supplying the above-mentioned light source unit 411 with power at a stable voltage. The lamp driving unit rectifies and converts a commercial alternating current inputted from the power supply unit into a direct current or an alternating rectangular wave current to supply the light source unit 411 with the converted current.

In front of the power supply block 6, provided is an exhaust fan 61, as shown in FIG. 3. Air having cooled the respective components in the projector 1 is collected by means of the exhaust fan 61 to be discharged to the outside of the apparatus from the opening 28 of the external case 2.

Figure 9:
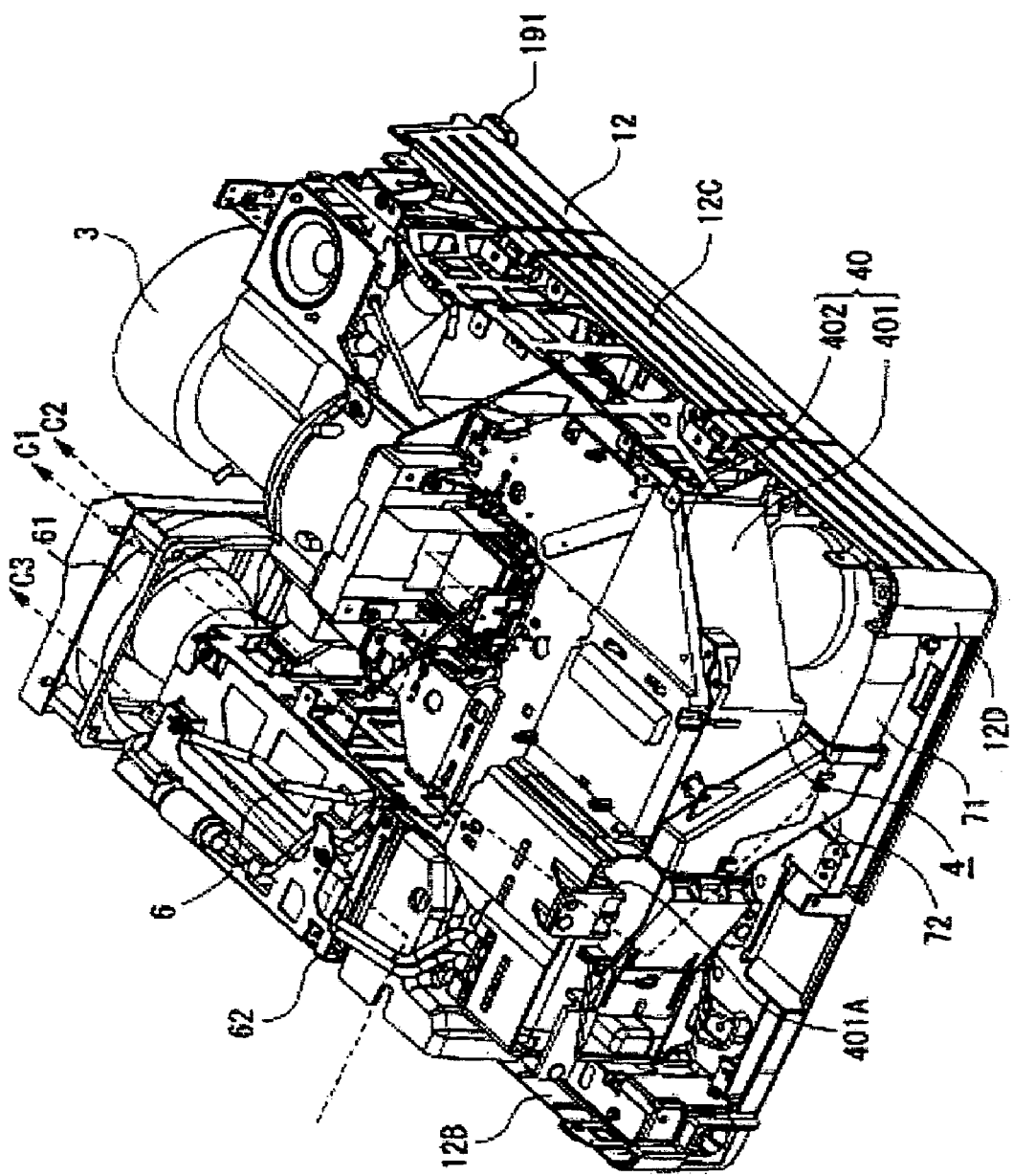
FIG. 9 illustrates a cooling system of the projector in the embodiment.

FIG. 9 illustrates a cooling system of the projector 1. The inside of the projector 1 is heated due to generation of heat from the light source unit 411 and the power supply block 6. Accordingly, it is necessary to circulate cooling air inside to efficiently cool the light source unit 411, the electro-optical apparatus 44 and the power supply block 6. For the purpose of the above, three cooling flow paths C1, C2 and C3 are provided as shown in FIG. 9 in the exemplary embodiment.

The cooling flow path C1 is a flow path for cooling the light source unit 411 and the polarization converting device 415, which form the integrator illumination optical system 41. The cooling flow path C1 supplies the light source unit 411 and the polarization converting device 415 through a duct 72 from the side of the light source housing portion 401A of the case for optical components 40 with cooling air sucked by means of a sirocco fan 71 provided inside the inhale opening 24 of the apparatus, the inhale opening 24 being shown in FIG. 2, and cools the light source unit 411 and the polarization converting device 415. The air having been used for cooling the above is sucked by the exhaust fan 61 to be discharged to the outside of the projector 1.

The cooling flow path C2 is a flow path for cooling the electro-optical apparatus 44 for carrying out optical modulation and color composition. The cooling flow path C2 supplies the electro-optical apparatus 44 from the lower side to the upper side of the electro-optical apparatus 44 with cooling air sucked by means of a sirocco fan (mentioned later) provided inside an inhale opening of the apparatus, the inhale opening being formed where the filter 23 shown in FIG. 2 is provided, to cool the liquid crystal panels 441R, 441G and 441B, the incident side polarizing plate 442, the angle-of-view corrector plate 443 and the projecting side polarizing plate 444. The air having been used for cooling the above flows along the bottom surface of the main substrate 51 and the upper surface of the case 11A of the upper case 11 to cool circuit devices mounted on the main substrate 51 and to be discharged to the outside by the exhaust fan 61.

The cooling flow path C3 is a flow path for cooling the power supply block 6. The cooling flow path C3 takes in cooling air from the opening 112 formed in the side surface of the case 11B of the upper case 11 and the opening 122 formed in the side surface of the case 12B of the lower case 12 by means of an intake fan 62 provided on a rear end side of the power supply block 6. A part of the cooling air taken in is supplied to the power supply unit and the lamp driving unit to cool the same, and then, discharged to the outside by means of the exhaust fan 61.

Figure 10:
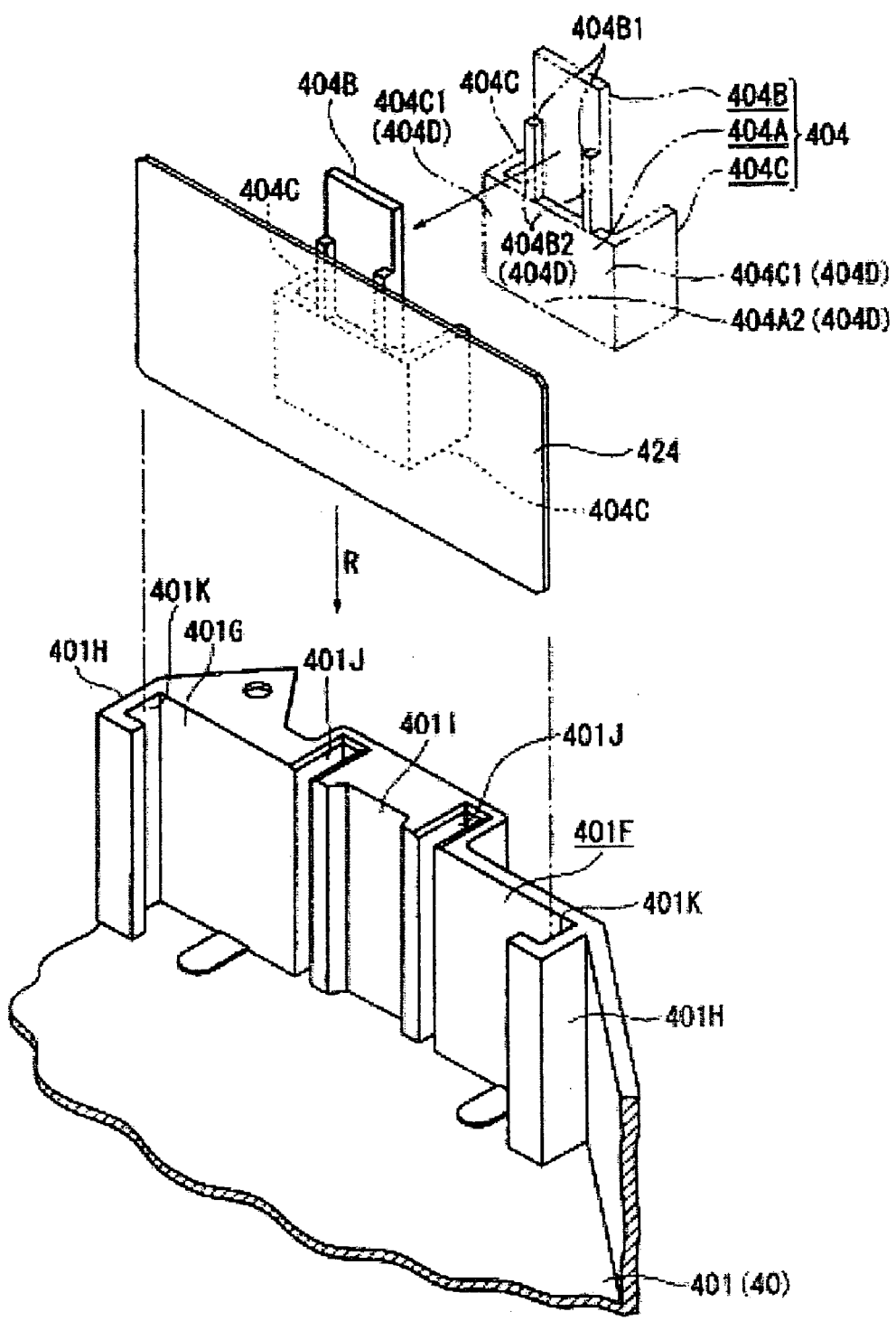
FIG. 10 is an exploded perspective view of a holding structure of a reflection mirror in the embodiment.
Figure 11:
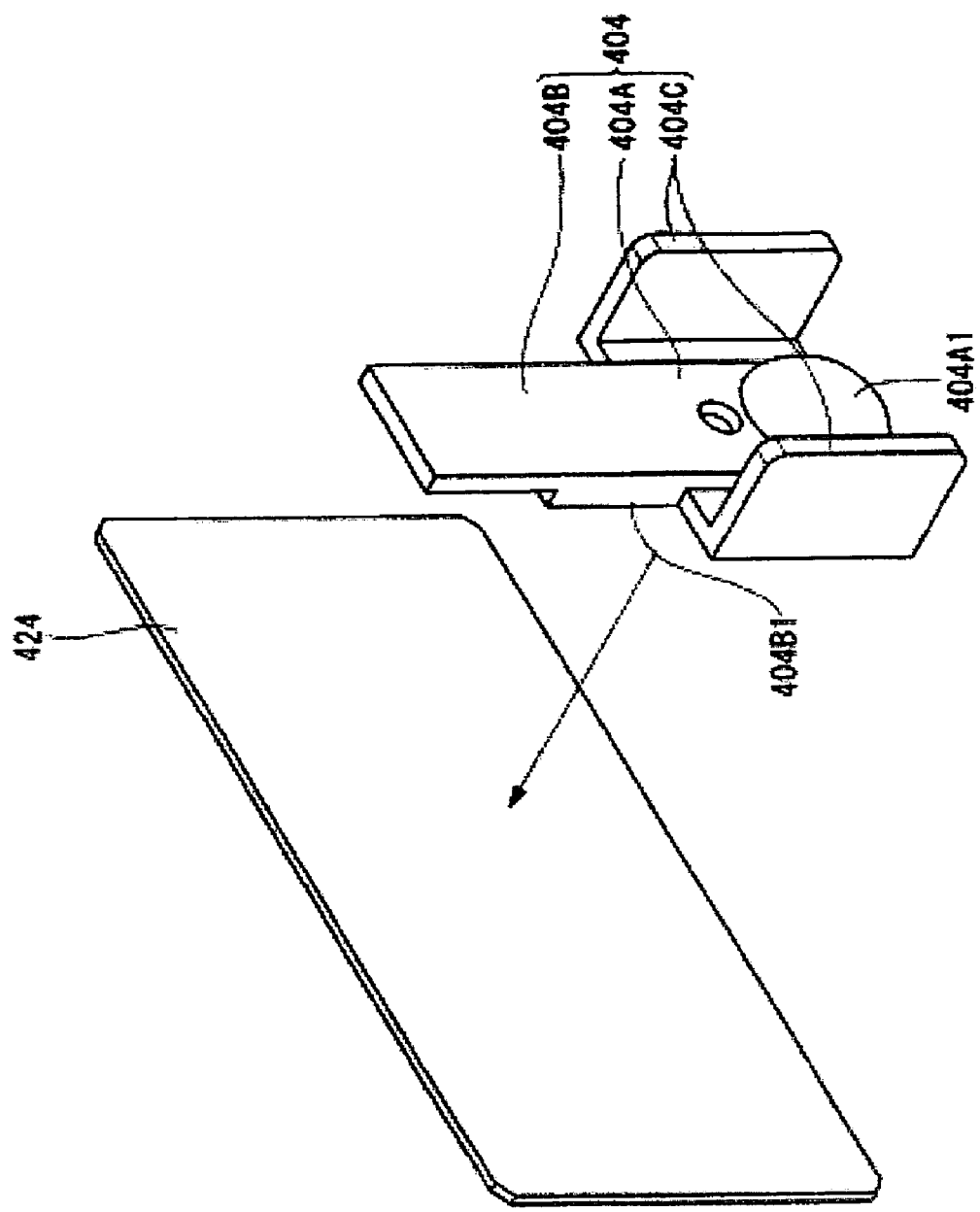
FIG. 11 illustrates a structure of a mirror attitude adjusting member in the exemplary embodiment.

A holding structure of the above-mentioned reflection mirror 424 will be now described on the basis of the drawings. FIG. 10 is an exploded perspective view showing a holding structure of the reflection mirror 424. FIG. 11 illustrates a structure of the mirror attitude adjustment member 404. FIG. 12 is a plan view of the holding structure of the reflection mirror 424 from the upper side thereof.

The reflection mirror 424 is set in the reflection mirror setting portion 401F of the component housing member 401 through the mirror attitude adjusting member 404 so that a attitude of the reflection mirror 424 would be adjustable, as shown in FIG. 10.

The mirror attitude adjusting member 404 is for adjusting a attitude of the reflection mirror 424 with respect to the illumination optical axis A (FIG. 7) in the component housing member 401. The mirror attitude adjusting member 404 comprises a protruded part 404A, a mirror attitude adjusting lever 404B and a pair of fixing parts 404C, as shown in FIGS. 10 to 12.

The protruded part 404A is formed from a plate body substantially in the shape of a rectangle in the plane view, as shown in FIG. 10 or 11. On a side surface of the plate body, formed is a convex curved surface 404A1 (FIG. 11) protruded toward the outside of the surface. An end surface 404A2 (FIG. 10) on the opposite side to the convex curved surface 404A1 is formed flat.

The mirror attitude adjusting lever 404B is formed into the shape of a substantially rectangular pillar, as shown in FIG. 10 or 11. The mirror attitude adjusting lever 404B is connected in one body with the protruded part 404A so that one side surface thereof would be substantially parallel to and backstep from the end surface 404A2 of the protruded part 404A. Further, on one side surface of the mirror attitude adjusting lever 404B, formed is a pair of projecting parts 404B1 extending along the left and right side edge and projecting from the one side surface, as shown in FIG. 10 or 11. Ends 404B2 in a projecting direction of the projecting parts 404B1 are formed so as to be in one plane with the end surface 404A2 of the protruded part 404A, as shown in FIG. 10 or 12. When the mirror attitude adjusting member 404 is fixed to the reflection mirror 424, it is arranged that a gap be formed between the mirror attitude adjusting lever 404B and the reflection mirror 424 through the pair of projecting parts 404B1 while the mirror attitude adjusting lever 404B extend upward from the protruded part 404A so that the top end of the mirror attitude adjusting lever 404B would project flat from the upper edge of the reflection mirror 424, as shown in FIG. 10.

The pair of fixing parts 404C is parts for fixing the reflection mirror 424 to the reflection mirror setting portion 401F. The pair of fixing parts 404C is arranged to be in parallel in a direction substantially orthogonal to a direction R (FIG. 10) of setting the reflection mirror 424 in the reflection mirror setting portion 401F with the protruded part 404A being sandwiched between the pair of fixing parts 404C. As shown in FIGS. 10 to 12, the pair of fixing parts 404C has a substantially L-shaped cross-section and is projected outward by 5 to 10 mm, for example, from the lateral ends of the protruded part 404A along the end surface 404A2 of the protruded part 404A while the top ends in the projecting direction of the pair of fixing parts 404C are bent at an angle of substantially 90 degrees to respectively project in a direction away from the reflection mirror 424. Respective end surfaces 404C1 of the pair of fixing parts 404C, which face to the reflection mirror 424, are in one plane with the end surface 404A2 of the protruded part 404A, as shown in FIG. 10.

The end surface 404A2 of the protruded part 404A, the ends 404B2 in the projecting direction of the mirror attitude adjusting lever 404B and the respective end surfaces 404C1 of the pair of fixing parts 404C function as a mounting surface 404D, which is to be fixedly adhered to a back surface of the reflection surface of the reflection mirror 424.

In the above case, the convex curved surface 404A1 of the protruded part 404A and the pair of fixing parts 404C preferably satisfy the following relation.

That is to say, it is preferable to satisfy a relation expressed by a formula 1.

The formula 1 is "Hb/2≦Ha<Hb", wherein Ha is a height from the mounting surface 404D to the top 404A3 of the convex curved surface 404A1 while Hb is a length from the mounting surface 404D in the projecting direction of the pair of fixing parts 404C projecting in a direction away from the reflection mirror 424, as shown in FIG. 12.

The convex curved surface 404A1 of the protruded part 404A and the pair of fixing parts 404C are formed so that a formula of Ha=Hb/2 would be satisfied in the embodiment.

The protruded part 404A, the mirror attitude adjusting lever 404B and the pair of fixing parts 404C, which are described above, form a molded product formed into one body by injection molding of synthetic resin or the like.

The reflection mirror setting portion 401F is for setting the reflection mirror 424 in a predetermined position with respect to the inside illumination optical axis A (FIG. 7). The reflection mirror setting portion 401F is a side surface of the component housing member 401 as shown in FIG. 10 or 12. The reflection mirror setting portion 401F comprises a side wall 401G in the shape of a substantial rectangle in the plane view, a pair of rising ribs 401H formed on both of the left and right edges of the side wall 401G, an adjusting member contacting part 401I located at the substantially center part in the lateral direction of the side wall 401G and a pair of fixing grooves 401J formed on both of the left and right sides of the adjusting member contacting part 401I.

Among the above components, the pair of rising ribs 401H has a substantially L-shaped cross section and is arranged so that an opening part of the L is faced each other. That is to say, as shown in FIG. 10 or 12, the pair of the rising ribs 401H and the side wale 401G form the mirror housing grooves 401K into which the reflection mirror 424 is slid in the housing direction R (FIG. 10) from the upper side to be housed in the reflection mirror setting portion 401F.

The adjusting member contacting part 401I is a part in contact with the convex curved surface 404A1 of the protruded part 404A forming the mirror attitude adjusting member 404 fixedly adhered to the back surface of the reflection surface of the reflection mirror 424. As shown in FIG. 10 or 12, the adjusting member contacting part 401I is formed in the shape of a concave recessed outward from an upper side edge of the side wall 401G to a lower side edge. The bottom of the concave is formed into a substantial plane. The convex curved surface 404A1 of the protruded part 404A becomes in contact with the bottom.

Figure 13:
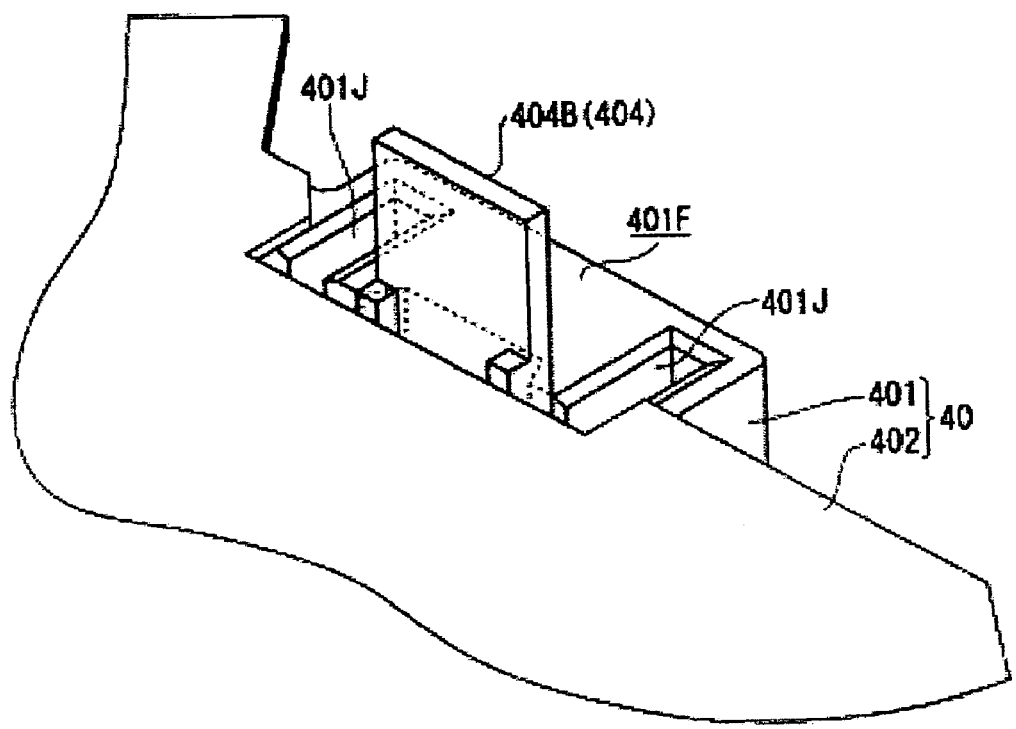
FIG. 13 illustrates a position of a pair of fixing grooves with respect to a lid member in the exemplary embodiment.

FIG. 13 illustrates a location of the pair of fixing grooves 401J with respect to the lid member 402.

The pair of fixing grooves 401J guides movement of the pair of fixing parts 404C forming the mirror attitude adjusting member 404 fixedly adhered to the back surface of the reflection surface of the reflection mirror 424 in setting the reflection mirror 424 in the reflection mirror setting part 401F. The pair of fixing parts 404C is provided in the pair of fixing grooves 401J with play. The pair of fixing grooves 401J is formed respectively into concaves recessed outward from the upper side edge of the side wall 401G to the lower side edge in the housing direction R (FIG. 10). The upper corner parts of the pair of fixing grooves 401J are beveled as shown in FIGS. 10, 12 and 13. Such a shape allows the pair of fixing parts 404C to be easily guided in the pair of fixing grooves 401J, so that the reflection mirror 424 can be easily set in the reflection mirror setting part 401F.

In the exemplary embodiment, the pair of fixing grooves 401J is formed so as not to interfere with the lid member 402 on a plane, that is, so as to be located outside the lid member 402 in the plane view when the component housing member 401 is combined with the lid member 402, as shown in FIG. 13.

Now, setting the reflection mirror 424 in the reflection mirror setting portion 401F will be described. First, the mirror attitude adjusting member 404 is fixedly adhered to the back surface of the reflection surface of the reflection mirror 424. Then, the reflection mirror 424 with the mirror attitude adjusting member 404 mounted thereto is moved from the upper side of the reflection mirror setting portion 401F in the housing direction R to be slid and housed into the mirror housing grooves 401J. In this process, the mirror attitude adjusting member 404 mounted to the reflection mirror 424 is guided to the adjusting member contacting part 401I and the pair of fixing grooves 401J so that the reflection mirror 424 is provided in a predetermined position of the reflection mirror setting portion 401F.

The lid member 402 can be set in the opening 401B1 of the component housing member 401 to close the opening 401B1 of the component housing member 401. At that time, the other optical components 41, 421 to 423, 425, 43 and 44 (including the head body 403 and the projecting lens 3 fixed to the head body 403) are also housed in the component housing member 401. In this condition, a top end of the mirror attitude adjusting lever 404B of the mirror attitude adjusting member 404 projects through the opening 402A (FIG. 5) of the lid member 402.

After the above, the light source unit 411 is turned on to introduce a light beam into the case for optical components 40. A projected picture, which is magnified and projected by means of the projecting lens 3 through the optical components 41 to 44 to be projected on a screen, for example, is observed to carry out adjustment of a attitude of the reflection mirror 424.

The top end of the mirror attitude adjusting lever 404B projecting through the opening 402A of the lid member 402 can be griped with a hand to move the mirror attitude adjusting lever 404B front and back and left and right, for example, in a plane direction of the lid member 402 with the convex curved surface 404A1 of the protruded part 404A being in contact with the adjusting member contacting part 401I. This allows the reflection mirror 424 to be three-dimensionally moved along the shape of the convex curved surface 404A1, so that a attitude of the reflection surface of the reflection mirror 424 is adjusted.

In the exemplary embodiment, the attitude of the reflection surface of the reflection mirror 424 is adjusted within a range of ±3° of the angle of inclination from the predetermined position of the reflection mirror setting portion 401F, provided that the angle of inclination is 0° when the reflection mirror 424 is set in the predetermined position.

Following to the adjustment of the attitude of the reflection mirror 424, instant adhesive is injected in a space between the pair of fixing grooves 401J located outside the lid member 402 in the plane view and the pair of fixing parts 404C to fixedly adhere the pair of fixing grooves 401J and the pair of fixing parts 404C. This allows the reflection mirror 424 to be fixedly positioned with respect to the reflection mirror setting portion 401F.

In the exemplary embodiment, the mirror attitude adjusting member 404 including the protruded part 404A, the mirror attitude adjusting lever 404B and the pair of fixing parts 404C is fixedly adhered to the back surface of the reflection surface of the reflection mirror 424 while the pair of fixing parts 404C is inserted in the pair of fixing grooves 401J formed in the side wall 401G. This allows the pair of fixing parts 404C to be guided for movement by the pair of fixing grooves 401J and the reflection mirror 424 to be housed in the component housing portion 401B through the opening 401B1, so that the reflection mirror 424 can be easily set in the reflection mirror setting portion 401F. In this case, the pair of fixing parts 404C is provided in the pair of fixing grooves 401J with play. Accordingly, the convex curved surface 404A1 of the protruded part 404A can be in contact with the adjusting member contacting part 401I formed in the side wall 401G. Then, gripping the mirror attitude adjusting lever 404B with a hand to move the same with the protruded part 404A being in contact with the adjusting member contacting member 401I allows the reflection mirror 424 to be three-dimensionally moved along the shape of the convex curved surface 404A1 of the protruded part 404A. The attitude of the reflection surface of the reflection mirror 424 can be thus adjusted easily. Further, instant adhesive is applied to a space between the pair of fixing parts 404C and the pair of fixing grooves 401J after adjusting the attitude of the reflection mirror 424 allows the reflection mirror 424 to be fixedly adhered to the reflection mirror setting portion 401F. This contributes to achievement of a structure capable of reducing in number of components and manufacturing cost much more than the mirror holding structure, which has been used up to the present and in which the number of components such as two leaf springs, two eccentric circular plates and the like is large.

Moreover, fixedly adhering the mirror attitude adjusting member 404 to the back surface of the reflection surface of the reflection mirror 424 in advance allows an operation of setting the reflection mirror 424 in the reflection mirror setting portion 401F to be easily performed.

In addition to the above, applying instant adhesive to a space between the pair of fixing parts 404C and the pair of fixing grooves 401J to fix the reflection mirror 424 to the reflection mirror setting portion 401F allows the reflection mirror 424 to be firmly fixed to the component housing member 401 with a simple structure, so that the attitude of the reflection mirror 424 can be maintained well.

The mirror attitude adjusting member 404 is a molded product formed into one body from the protruded part 404A, the mirror attitude adjusting lever 404B and the pair of fixing parts 404C. This contributes to further reduction of the number of components as well as easy performance of an operation of mounting the protruded part 404A, the mirror attitude adjusting lever 404B and the pair of fixing parts 404C to the reflection mirror 424. That is to say, an operation of setting the reflection mirror 424 in the reflection mirror setting portion 401F can be further easily performed.

In the exemplary embodiment, the attitude of the reflection mirror 424 is adjusted within a range of ±3° of the angle of inclination from the predetermined position. Accordingly, it is not necessary to set a rotational center of the reflection mirror 424, that is, a virtual center of the convex curved surface 404A1 to be located on the reflection surface of the reflection mirror 424. This requires no necessity of forming the convex curved surface 404A1 of the protruded part 404A with high precision in shape. Only contacting the convex curved surface 404A1 with the adjusting member contacting part 401I and three-dimensionally moving the reflection mirror 424 along the shape of the convex curved surface 404A1 allow the attitude of the reflection mirror 424 to be adjusted well.

Further, the top end of the mirror attitude adjusting lever 404B projects from the upper edge of the reflection mirror 424 and through the opening 402A of the lid member 402 when the component housing member 401 is connected to the lid member 402. Accordingly, the mirror attitude adjusting lever 404B projecting through the opening 402A of the lid member 402 can be moved, that is, the attitude of the reflection mirror 424 can be adjusted even after setting all of the optical components 41 to 44 in the component housing member 401 to connect the lid member 402 with the component housing member 401. This allows manufacturing of the optical unit 4 to be completed after adjusting the attitude of the reflection mirror 424, so that the optical unit 4 can be rapidly manufactured.

Moreover, the pair of fixing grooves 401J is formed so as to be located outside the lid member 402 in the plane view when the component housing member 401 is connected with the lid member 402. Accordingly, instant adhesive can be applied to a space between the pair of fixing parts 404C and the pair of fixing grooves 401J in adjusting the attitude of the reflection mirror 424 to fix the same to the component housing member 401 even after setting all of the optical components 41 to 44 in the component housing member 401 to connect the lid member 402 with the component housing member 401. This allows manufacture of the optical unit 4 to be completed after adjusting the attitude of the reflection mirror 424 to fix the same to the component housing member, so that the optical unit 4 can be rapidly manufactured.

By the way, there is a problem described below when the protruded part 404A and the pair of fixing parts 404C are formed so as to satisfy a relation expressed by the following formula 2.

The formula 2 is "$Ha < Hb/2$", wherein $Ha$ is a height from the mounting surface 404D to the top 404A3 of the convex curved surface 404A1 while $Hb$ is a length from the mounting surface 404D in the projecting direction of the pair of fixing parts 404C projecting in a direction away from the reflection mirror 424, as described above.

In the case of satisfying the relation expressed by the formula 2, a moving amount of the top ends of the pair of fixing parts 404C projecting in a direction away from the reflection mirror 424 increases in adjusting the attitude of the reflection mirror 424. This easily causes mechanical interference of the top ends of the pair of fixing parts 404C with inner circumferential surfaces of the pair of fixing grooves 401J in adjusting the attitude of the reflection mirror 424. The pair of fixing grooves 401J should be formed large in groove shape in order to avoid the mechanical interference with the pair of fixing parts 404C.

In the exemplary embodiment, the protruded part 404A and the pair of fixing parts 404C are formed so as to satisfy the above-mentioned relation expressed by the formula 1. Accordingly, the moving amount of the top ends of the pair of fixing parts 404C in adjusting the attitude of the reflection mirror 424 can be reduced much more than the case that the protruded part 404A and the pair of fixing parts 404C are formed so as to satisfy the relation expressed by the formula 2. This allows the mechanical interference of the top ends of the pair of fixing parts 404C with the inner circumferential surfaces of the pair of fixing grooves 401J to be avoided in adjusting the attitude of the reflection mirror 424, so that the attitude of the reflection mirror 424 can be smoothly adjusted with high precision. The pair of fixing grooves 401J is also not necessary to be formed large in groove shape for the purpose of avoiding the mechanical interference with the pair of fixing parts 404C.

Further, the protruded part 404A and the pair of fixing parts 404C are formed so as to satisfy a relation of "Ha=Hb/2" in the embodiment. Accordingly, the length of the pair of fixing parts 404C projecting in the direction away from the reflection mirror 424 is not shortened unnecessarily. This allows the pair of fixing parts 404C to be firmly fixed to the pair of fixing grooves 401J, so that the attitude of the reflection mirror 424 can be maintained well.

Moreover, the mirror housing grooves 401K are formed at both of the left and right ends of the side wall 401G. Accordingly, sliding the reflection mirror 424 along the mirror housing grooves 401K allows the reflection mirror 424 to be easily set in the reflection mirror setting portion 401F. This contributes to a further easy setting operation of the reflection mirror 424.

The invention has been described above with a preferable embodiment exemplified. It should be understood that the invention, however, is not limited to the above. Various kinds of improvement and modification in design are available within a scope not exceeding the spirit of the invention.

The mirror attitude adjusting member 404 is fixedly adhered to the back surface of the reflection surface of the reflection mirror 424 in the embodiment. The invention, however, is not limited to the above. The mirror attitude adjusting member 404 may be mounted by double-faced adhesive tape or such.

In the exemplary embodiment, described is a structure in which the protruded part 404A, the mirror attitude adjusting lever 404B and the pair of fixing parts 404C are integrally molded, but the invention is not limited to the above. The protruded part 404A, the mirror attitude adjusting lever 404B and the pair of fixing parts 404C may be respectively formed into separate bodies, for example. In this case, the mirror attitude adjusting lever 404B can be fixed in any position so long as the top end thereof projects flat from the upper edge of the reflection mirror 424.

The pair of fixing parts 404C is arranged to be in parallel in a direction substantially orthogonal to the direction of housing the reflection mirror 424 in the reflection mirror setting portion 401F with the protruded part 404A being sandwiched between the pair of fixing parts 404C in the embodiment. The invention, however, is not limited to the above. Any arrangement may be adopted as long as the pair of fixing parts 404C is arranged with the protruded part 404A being sandwiched therebetween. The pair of fixing parts 404C may be arranged respectively in a direction crossing the direction orthogonal to the housing direction, for example.

Furthermore, the length Hb of the pair of fixing parts 404C in the direction projecting from the mounting surface 404D is assumed to be equal in the embodiment, but the invention is not limited to the above. The length of the pair of fixing parts 404C may be different as long as the relation expressed by the formula 1 is satisfied.

It is also possible to separately form the mirror attitude adjusting lever, the protruded part and the pair of fixing parts and to omit the rising ribs 401H of the reflection mirror setting portion 401F in the exemplary embodiment.

Figure 14:
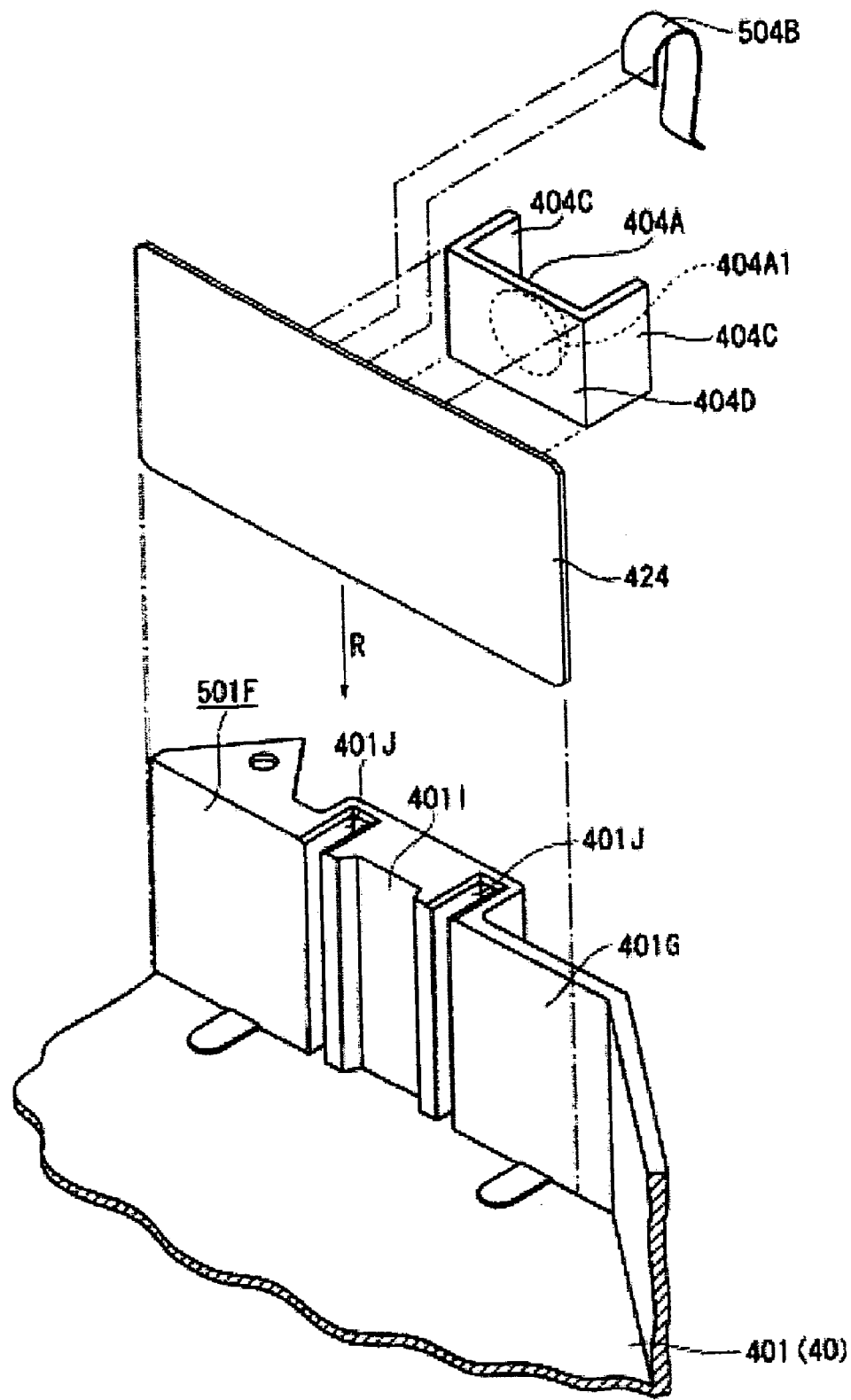
FIG. 14 illustrates a modified exemplary embodiment of the invention.

FIG. 14 illustrates a modification of the exemplary embodiment.

To the back surface of the reflection surface of the reflection mirror 424, fixedly adhered are the protruded part 404A and the pair of fixing parts 404C, which are described in the first embodiment, and a mirror attitude adjusting lever 504B. The protruded part 404A, the pair of fixing parts 404C and a mirror attitude adjusting lever 504B are formed into separate bodies as shown in FIG. 14.

In setting the reflection mirror 424 in a reflection mirror setting portion 501F, the above-mentioned mounting surface 404D of the protruded part 404A and the pair of fixing parts 404C and a base end of the mirror attitude adjusting lever 504B are respectively adhered fixedly to the back surface of the reflection mirror 424 in advance. The reflection mirror 424 under such a condition is housed in the component housing member 401 from the upper side of the reflection mirror setting part 501F in the housing direction R so that a top end of the mirror attitude adjusting lever 504B would be located outside the component housing member 401. At that time, the convex curved surface 404A1 of the protruded part 404A becomes in contact with the adjusting member contacting part 401I of the reflection mirror setting portion 501F while the pair of fixing parts 404C is provided with play in the pair of fixing grooves 401J of the reflection mirror setting portion 501F. Under such a condition, the reflection mirror 424 is held so that the mirror attitude adjusting lever 504B would urge the reflection mirror 424 against the reflection mirror setting portion 501F.

Then, a part of the mirror attitude adjusting lever 504B, which projects upward, is gripped with a hand to adjust the attitude of the reflection mirror 424 similarly to the case of the first embodiment. After the attitude of the reflection mirror 424 is adjusted, instant adhesive is injected in a space between the pair of fixing parts 404C and the pair of fixing grooves 401J to fix the reflection mirror 424 in the reflection mirror setting portion 501F, similarly to the first embodiment.

In such structure, the rising ribs 401H can be omitted, and thereby, a manufacturing cost of the optical unit 4 can be reduced more while the reflection mirror 424 can be more easily set in the reflection mirror setting portion 501F than the case of the first embodiment.

The side wall 401G can include the adjusting member contacting part 401I, which is formed at the substantially center part in the lateral direction so as to be recessed outward, in the first exemplary embodiment. The convex curved surface 404A1 of the protruded part 404A, however, may be directly contacted with the side wall 401G without providing the adjusting member contacting part 401I.

In the first exemplary embodiment, the adjusting member contacting part 401I and the pair of fixing grooves 401J are formed from the upper edge to the lower edge of the side wall 401G. The invention, however, is not limited to the above. The adjusting member contacting part 401I and the pair of fixing grooves 401J are not necessarily formed to the lower edge so long as they are formed correspondingly to the location of the protruded part 404A and the pair of fixing parts 404C.

The shapes of the mirror housing grooves 401K are not limited to what described in the first embodiment. Any shape may be applied as long as the reflection mirror 424 can be slid for insertion and extraction.

The reflection mirrors 421, 432 and 434 other than the reflection mirror 424 in the first embodiment may be also arranged to be held in the case for optical components 40 so that the attitude thereof can be adjusted similarly to the reflection mirror 424.

In the first exemplary embodiment, the projector 1 using three liquid crystal panels 441R, 441G and 441B is described. It should be understood that the invention, however, is not limited to the above. The invention is also applicable to a projector using only one liquid crystal panel, a projector using two liquid crystal panels or a projector using four or more liquid crystal panels, for example.

The case for optical components 40 is substantially in the shape of an L in the plane view in the first exemplary embodiment, but may be in another shape such as a substantial U in the plane view, for example.

In the first exemplary embodiment, used is a permeation type of optically modulating apparatus in which a light incident surface and a light projecting surface are different. However, a reflection type of optically modulating apparatus in which the light incident surface and the light projecting surface are same may be used.

In the first exemplary embodiment, exemplified is only the case of a front type of projector in which projection is carried out in a direction of observing a screen. The invention, however, is also applicable to a rear type of projector in which projection is carried out in a direction opposite to the direction of observing a screen.

In the first exemplary embodiment, described is a case that the holding structure of the reflection mirror 424 is applied to the projector 1. The invention, however, is not limited to the above. The holding structure of the reflection mirror may be applied to other optical tools.

The best modes for carrying out the invention are disclosed in the above description, but the invention is not limited to the above. That is to say, the invention is particularly shown and described mainly with respect to specific embodiments, but a person skilled in the art can add various kinds of modification in shape, material, quantity or the other details of the embodiments without deviating from the technical spirit and scope of the invention.

Accordingly, description defining a shape, a material and the like disclosed in the above is only an exemplification for the purpose of easy understanding of the invention and does not limit the invention. Description of names of the members, which include no description of a part of or all of limitation in shape, material and the like, is therefore included in the invention.

An optical apparatus in accordance with the invention is useful as an optical apparatus for a projector used in a home theater or a presentation since it is capable of reducing the number of components, and thereby, a manufacturing cost as well as easily carrying out setting and attitude adjustment of a reflection mirror. Further, a manufacturing cost can be effectively reduced since no special apparatus or jig is required for adjusting an optical axis in manufacturing the optical apparatus in accordance with the invention.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An optical apparatus, comprising:
   optical components including a reflection mirror provided in an optical path of light beams emitted from a light source;
   a case for optical components that houses and holds the plural optical components in a predetermined position with respect to an illumination optical axis of the light beams;
   a protruded part mounted to a back surface of a reflection surface of a reflection mirror, having a convex curved surface protruded to an outside of the surface of the reflection mirror and being in contact with a side wall when the reflection mirror is set along the side wall;
   a pair of fixing parts respectively mounted to the back surface of the reflection surface of the reflection mirror so as to sandwich the protruded part therebetween and projecting to the outside of the reflection mirror;
   the case for optical components being formed from a component housing member in the shape of a container having an opening through which the plural optical components are housed inside and a lid member that closes the opening of the component housing member;
   the reflection mirror being set along a side wall of the component housing member; and
   the side wall being provided with a pair of fixing grooves extending along a direction of housing the reflection mirror in the component housing member, guiding movement of the pair of fixing parts in setting the reflection mirror in the component housing member, and enabling the pair of fixing parts to be provided with play.

2. The optical apparatus according to claim 1, comprising a mirror attitude adjusting lever mounted to the back surface of the reflection surface of the reflection mirror, extending along the back surface of the reflection mirror, and projecting flat from an edge of the reflection mirror.

3. The optical apparatus according to claim 2,
   the protruded part, the pair of fixing parts, and the mirror attitude adjusting lever being an integrally molded product.

4. The optical apparatus according to claim 2,
   the lid member being formed with an opening corresponding to a setting position of the reflection mirror, and
   a top end of the mirror adjusting lever projecting through the opening of the lid member when the reflection mirror is set in the case for optical components.

5. The optical apparatus according to claim 1, the protruded part and the pair of fixing parts being formed so as to satisfy a relation of Hb/2≦Ha<Hb, where Ha is a height in a protruding direction of the protruded part and Hb is a length in a projecting direction of the pair of fixing parts.

6. The optical apparatus according to claim 1, the pair of fixing grooves being formed so as not to interfere with the lid member on a plane when the component housing member is combined with the lid member.

7. The optical apparatus according to claim 1, the side wall being formed with mirror housing grooves extending in a plane direction of the reflection mirror so that the reflection mirror can be inserted or extracted therein or therefrom.

8. A projector, comprising:

an optically modulating apparatus that modulates light beams emitted from a light source in accordance with image information to form an optical image; and a projection optical apparatus that magnifies and projects the optical image formed in the optically modulating apparatus, the projector including the optical apparatus according to claim 1.

9. The projector according to claim 8, comprising a mirror attitude adjusting lever mounted to the back surface of the reflection surface of the reflection mirror, extending along the back surface of the reflection mirror, and projecting flat from an edge of the reflection mirror.

10. The projector according to claim 9, the protruded part, the pair of fixing parts, and the mirror attitude adjusting lever being an integrally molded product.

11. The projector according to claim 9, the lid member being formed with an opening corresponding to a setting attitude of the reflection mirror, and a top end of the mirror adjusting lever projecting through the opening of the lid member when the reflection mirror is set in the case for optical components.

12. The projector according to claim 8, the protruded part and the pair of fixing parts being formed so as to satisfy a relation of Hb/2≦Ha<Hb, where Ha is a height in a protruding direction of the protruded part and Hb is a length in a projecting direction of the pair of fixing parts.

13. The projector according to claim 8, the pair of fixing grooves being formed so as not to interfere with the lid member on a plane when the component housing member is combined with the lid member.

14. The projector according to claim 8, the side wall being formed with mirror housing grooves extending in a plane direction of the reflection mirror so that the reflection mirror can be inserted or extracted therein or therefrom.

* * * * *